United States Patent [19]

Teruuchi et al.

[11] 3,898,692

[45] Aug. 5, 1975

[54] AUTOMATIC PLAYER FOR TAPE CASSETTES

[75] Inventors: Yoshifumi Teruuchi, Osaka; Masayuki Namiki, Chiba; Tomio Nishii, Osaka, all of Japan

[73] Assignee: Matsushita Electric Industrial Co., Ltd., Kadoma, Japan

[22] Filed: Mar. 21, 1973

[21] Appl. No.: 343,424

Related U.S. Application Data

[62] Division of Ser. No. 58,549, July 27, 1970, Pat. No. 3,778,066.

[30] Foreign Application Priority Data

| | | |
|---|---|---|
| July 28, 1969 | Japan | 44-60690 |
| July 28, 1969 | Japan | 44-60691 |
| July 28, 1969 | Japan | 44-60692 |
| July 28, 1969 | Japan | 44-60693 |
| July 28, 1969 | Japan | 44-60694 |
| July 28, 1969 | Japan | 44-60695 |
| July 28, 1969 | Japan | 44-60696 |
| July 28, 1969 | Japan | 44-60697 |
| July 28, 1969 | Japan | 44-60698 |
| July 28, 1969 | Japan | 44-60699 |
| July 28, 1969 | Japan | 44-60700 |
| July 28, 1969 | Japan | 44-60701 |
| July 28, 1969 | Japan | 44-60702 |
| July 28, 1969 | Japan | 44-60703 |
| July 28, 1969 | Japan | 44-60704 |

[52] U.S. Cl. .......... 360/69; 360/92

[51] Int. Cl. .......... G11b 23/04; G11b 15/18

[58] Field of Search .......... 360/69, 92, 85, 93; 242/180, 181, 197–200; 352/6–7

[56] References Cited

UNITED STATES PATENTS

| | | | |
|---|---|---|---|
| 3,247,328 | 4/1966 | Mitchell et al. | 360/92 |
| 3,484,055 | 12/1969 | Raine | 360/92 |
| 3,512,785 | 5/1970 | Ban | 360/92 |
| 3,617,066 | 11/1971 | Foelkel et al. | 360/92 |
| 3,682,480 | 8/1972 | Ban | 360/92 |
| 3,682,483 | 8/1972 | White | 360/92 |

*Primary Examiner*—Alfred H. Eddleman
*Attorney, Agent, or Firm*—Stevens, Davis, Miller & Mosher

[57] ABSTRACT

In a magnetic tape recording and reproducing apparatus which is capable of playing a plurality of tape cassettes either selectively or continuously, an automatic player for tape cassettes which is so designed that a plurality of tape cassettes mounted in a movable cassette mount are carried to a cassette playing section by a carrier, played at the cassette playing section and then returned to the cassette mount again by the carrier, one at a time.

7 Claims, 32 Drawing Figures

AUTOMATIC PLAYER FOR TAPE CASSETTES

This is a division of application Ser. No. 58,549, filed July 27, 1970, now U.S. Pat. No. 3,778,066.

This invention relates to an automatic player for tape cassettes, which is designed for playing a plurality of tape cassettes mounted in a movable cassette mount.

In general, an apparatus for playing a plurality of recording medium, with a voice or music previously recorded therein, either continuously or selectively one after another, is already known in the form of a juke box or the like. However, conventional apparatus of this type is complicated in construction and expensive, and are used only for business at coffee shops, etc.

Recently, a number of recorded tape cassettes with a music-recorded tape therein, have been placed on the market, and under these circumstances, the development of an apparatus has been desired which can be used at home for playing such tape cassettes either continuously or selectively one after another and which is simple in handling, inexpensive, reliable in operation and operable with minimum trouble.

The present invention aims to provide an inexpensive, easy-handling, reliable and trouble-free magnetic tape recording and reproducing apparatus which meets the above-mentioned desire.

An object of the present invention is to provide an automatic player for tape cassettes, which comprises a rotatable cassette mount for holding a plurality of cassettes radially with a head insertion hole and a pinch roller insertion hole of each cassette located outwardly with respect to the center thereof, a cassette playing section formed adjacent said cassette mount and a carrier for carrying a specific one of said cassettes from said cassette mount to said cassette playing section horizontally with respect to a vertical rotary shaft of said cassette mount.

Another object of the invention is to provide an automatic player for tape cassettes, of the character described above, wherein the cassettes carried to the cassette playing section is engaged and played by a playing mechanism provided in said playing section and returned to the original position in said cassette mount by said carrier upon completion of the playing.

Still another object of the invention is to provide an automatic player for tape cassettes, of the character described above, which further comprises a photoconductive element or a light source moving in association with the movement of said cassette mount, at least the same number of light sources or photoconductive elements as the number of said plurality of cassettes mounted in said cassette mount fixed relative to said first photoconductive element or light source and at least the same number of switches as the number of said plurality of cassettes for turning said respective second light sources on or rendering said second respective photoconductive elements operative, the arrangement being such that when a selected one of said switches is operated, the corresponding second light source is turned on or the corresponding second photoconductive element is rendered operative, and the light of said second light source is sensed by said first photoconductive element during movement of said cassette mount, whereby the movement of said cassette mount is stopped and a cassette corresponding to said switch operated is carried by said carrier from said cassette mount to said cassette playing section.

According to the present invention, a plurality of cassettes can be played automatically in sequence by a simple operation. In this case, the insertion of a head and a pinch roller into a cassette can be effected by a simple mechanism, since the head insertion hole and the pinch roller insertion hole of the cassette are located on the front side of the cassette when the cassette is carried to the playing section.

Further, according to the present invention the engagement of a cassette with a first playing mechanism or a second playing mechanism, the insertion of the head and the pinch roller into the cassette for playing, can all be effected automatically by rotating a cam and hence no other control mechanisms are required at all. In addition, since such operations are effected only by the rotation of the cam, the construction of the apparatus is very simple and the operation thereof is reliable. Thus, the apparatus of this invention is most satisfactory as a mechanism for automatically reciprocating and playing a tape cassette.

Still further, according to the invention, since a cassette mount is provided on a cassette selection detecting box for rotation therewith, a mechanism for combining the cassette mount and the cassette selection detecting box can be constructed simply, and in addition, since a cassette desired to be played can be detected by a detecting mechanism provided in the selection detecting box in terms of angle of rotation of the selection detecting box and the cassette mount is rotated integrally with said selection detecting box, the positional interrelation between the detecting mechanism and cassettes can be easily established and a plurality of cassettes can be played selectively.

Still further, according to the invention, since the cassette desired to be played is detected by the detecting mechanism, the rotation of the cassette mount can be positively stopped by a locking lever and firmly held against rotation in its position. Therefore, the transfer of a cassette to be played from the cassette mount to the cassette playing section or the return movement of the cassette from the cassette playing section to the original position in the cassette mount, upon completion of playing, can be effected smoothly and a stable, positive playing operation can always be obtained.

Still further, according to the invention a plurality of cassettes mounted in the cassette mount can selectively be played one after another according to a previously established sequence or all of the cassettes can be played automatically successively according to the sequence in which they are arranged in the cassette mount, by a simple mechanism, which is of great practical advantage. Furthermore, the apparatus of the invention is provided with means by which the memory of each cassette to be played can be cancelled, so that a casual error in establishing the sequence of play can be readily corrected.

Still further, according to the invention the apparatus can be provided in a compact form and at a low cost because the detection of a desired cassette in the cassette mount can be attained by a simple mechanism consisting of a combination of a light source and a photoconductive element, and moreover the detecting operation is easy and reliable. The mechanism is quite satisfactory as one for selecting and detecting a plurality of cassettes.

Still further, according to the present invention a plurality of cassettes mounted in the cassette mount can be played selectively automatically one after another by the operation of corresponding play switches and the selection of the cassettes is effected by the combination of the light sources and the photoconductive element. Therefore, the operation of the apparatus is reliable and simple.

The present invention will be described in detail hereinafter with reference to the accompanying drawings, in which.

Figure 23A:
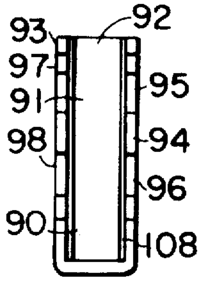
Figure 23B:
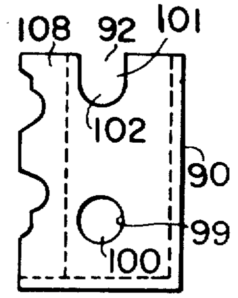
Figure 25:
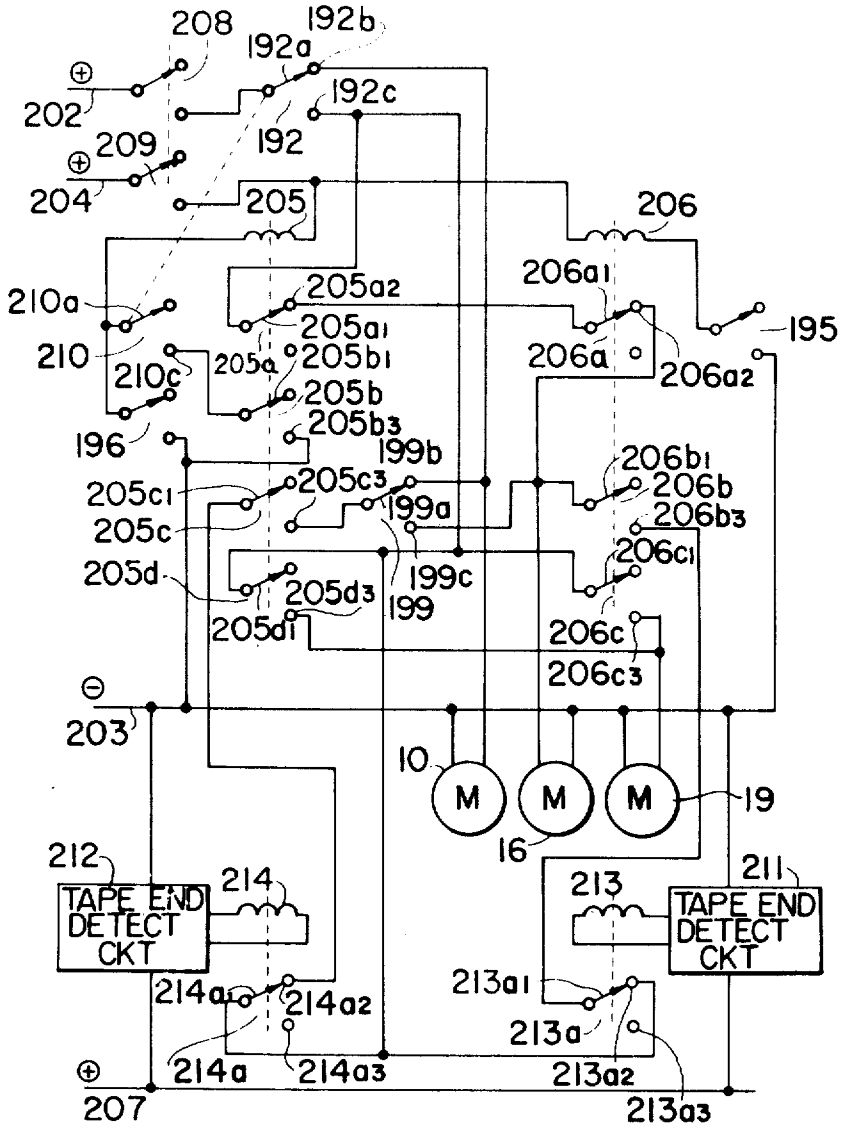
Figure 26:
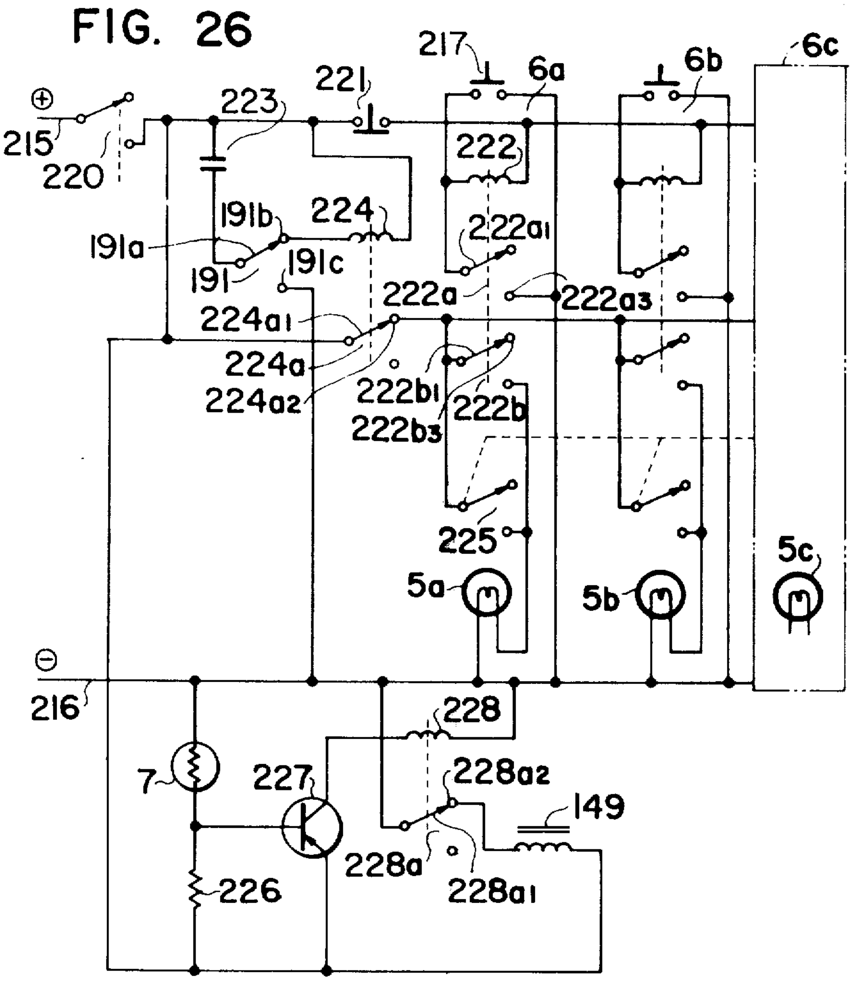
Figure 27:
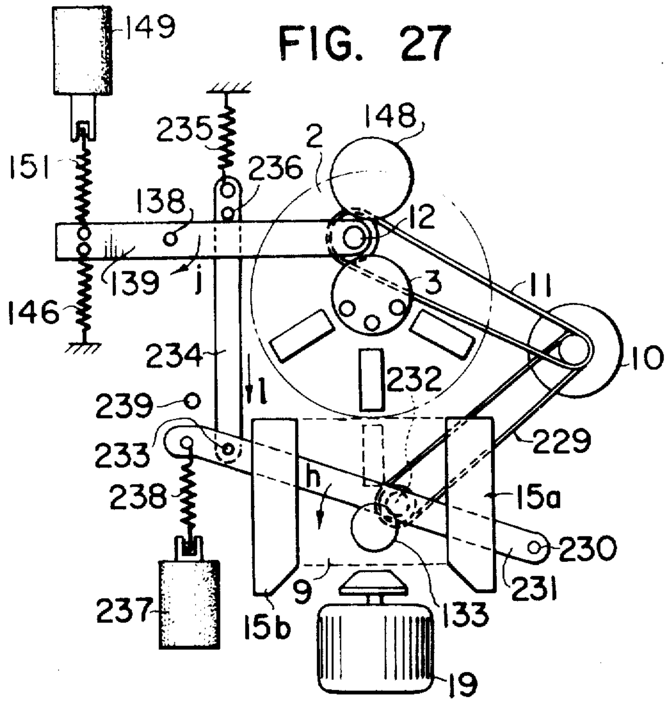
Figure 28A:
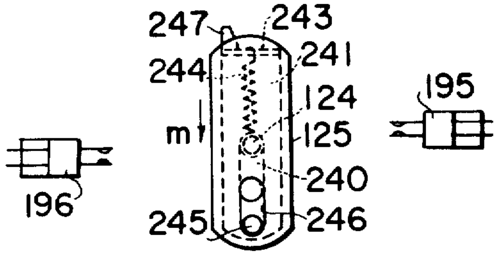
Figure 28C:
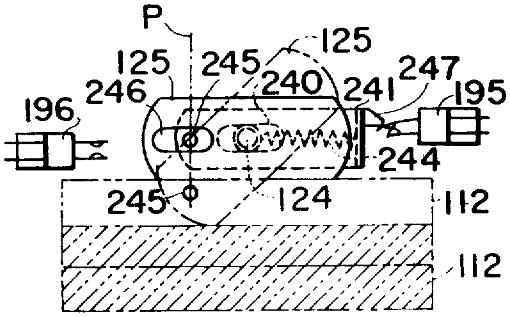
Figure 28B:
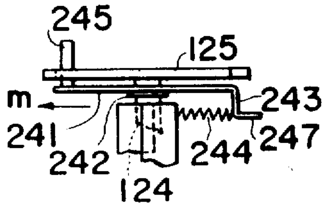

FIGS. 23*a* and 23*b* are a front elevational view and a side elevational view respectively of a cassette holder;

FIGS. 24*a* and 24*b* are a front elevational view and a side elevational view respectively of the cassette holder, with a cassette mounted therein;

FIG. 25 is a diagram of an electric circuit for controlling the respective mechanism of the apparatus;

FIG. 26 is a diagram of an electric circuit for controlling the cassette selection of the apparatus;

FIG. 27 is a top plan view briefly showing the mechanism of another embodiment of the apparatus of this invention; and FIGS. 28*a*, 28*b* and 28*c* are a top plan view and a side elevational view of the playing section control mechanism of said other embodiment of the apparatus in a stationary state respectively, and a side elevational veiw of the same in an operative state, respectively.

First of all, the constitutional elements of an embodiment of the apparatus according to the present invention will be described briefly in operational relation to each other with reference to FIG. 1.

The apparatus according to the invention comprises a cassette mount 2 on which a plurality of cassettes 1*a*, 1*b*, 1*c* . . . . . , each of the type of winding a magnetic tape from one reel to another, are radially mounted in such a manner that a head insertion hole and a pinch roller insertion hole of each cassette are located outwardly with respect to the center of said mount 2; a cassette selection detecting box 3 supporting said cassette mount 2 and being rotatably therewith; a cassette mount rotation control unit 4 for rotating said cassette mount 2 with said cassette selection detection box 3; a cassette selecting and memorizing unit 6 secured below said cassette selection detecting box 3 for selecting and memorizing a cassette to be played by means of a number of lamps 5*a*, 5*b*, 5*c* . . . . . corresponding to the number of cassettes 1*a*, 1*b*, 1*c* . . . . . ; a cassette detecting unit 8 for detecting said cassette to be played by a photoconductive element 7 disposed in said cassette selection detecting box 3; a drive control unit 13 for controlling the rotation of an idler 12, operatively connected to a motor 10 through a belt 11, for shifting a cassette detected by said cassette detecting unit 8 onto a cassette playing section 9 provided adjacent to said cassette mount 2 as well as for rotating said cassette mount; a cassette movement control unit 14 operated by said drive control unit 13 to shift the detected cassette to the playing section 9 or conversely from the playing section 9 to the cassette mount 2; a cassette playing mechanism control unit 17 for controlling the movements of two cassette playing mechanisms 15*a*, 15*b* to play the cassette which has been positioned on the playing section 9 by the cassette movement control unit 14; two tape end detectors 18*a*, 18*b* for detecting the end of the tape played by said two cassette playing mechanisms 15*a*, 15*b*; and a tape drive control unit 20 for controlling a motor 19 by which a tape in said cassette is actually driven by said cassette playing mechanisms 15*a*, 15*b*.

The apparatus of the construction described above operates in the following manner: Firtst of all, on ON - OFF switch of the apparatus is closed, whereupon the motor 10 is set in motion and the cassette mount 2 is rotated by the idler 12, together with the cassette selection detecting box 3. While the cassette mount 2 is rotating, playing a specific cassette or the entire cassettes is selected by means of external switches. Where playing of a specific cassette is selected, the rotation of the idler 12 is controlled by the drive control unit 13 by the co-operation of the lamp 5*a* of the cassette selecting and memorizing unit 6 and the photoconductive element 7 of the cassette detecting unit 8 when the cassette corresponding to the switch operated at first, e.g. the cassette 1a, is located in a position shown in FIG. 1, and the rotation of said cassette mount 2 is stopped. Successively thereafter, the rotation of the idler 12 is transmitted to the cassette movement control unit 14 and the cassette 1*a* is drawn out of the cassette mount 2 and shifted to the cassette playing section 9. When the cassette 1*a* has been placed on the cassette playing section 9, the rotation of the motor 10 is stopped and the motor 16 is set in motion by the cassette playing mechanism control unit 17. In this case, the cassette playing section 9 is first moved to the left and the first playing mechanism 15*a* is engaged with said cassette 1*a*. Upon completion of the engagement, the rotation of the motor 16 is stopped and the motor 19 is set in motion by the tape drive control unit 20 and thus the tape in said cassette 1a is fed in the normal direction automatically for playing.

The completion of the normal feed playing of the tape of the cassette 1a is detected by the tape end detector 18*a* and the operation of the detector 18*a* is transmitted to the cassette playing mechanism control unit 17 to drive the motor 16 again. In this case, the cassette playing section 9 is moved to the right and the second playing mechanism 15*b* is engaged by the cassette 1*a*. Upon completion of the engagement, the rotation of the motor 16 is stopped and the motor 19 is again set in motion by the tape drive control unit 20. Thus, a reverse feed playing of the tape of the cassette 1a is automatically effected. Upon completion of the reverse feed playing of the tape, the tape end is detected by the tape end detector 18*b* and the operation of said tape end detector 18*b* is transmitted to the cassette playing mechanism control unit. Therefore, the motor 16 is again set in motion and the cassette playing section 9 is returned to the initial position before the playing. In this case, the rotation 16 is stopped and at the same time the motor 10 is set in motion, whereby the cassette 1a is drawn out of the playing section 9 by the cassette movement control unit 14 and set in its original position on the cassette mount 2. When the cassette 1a has been set in the cassette mount, the position of the idler 12 is shifted by the drive control unit 13 to rotate the cassette mount again.

Now, when another cassette is selected for playing, during the above-described operation, by operating the external switch, such a selection is memorized by the cassette selecting and memorizing unit 6 which turns the lamps 5*b*, 5*c* ..... on, and the memory is detected by the photoconductive element 7 because the cassette selection detecting box 3 is rotated, together with the cassette mount 2, upon completion of the playing of the cassette 1*a*, and thereafter the tape in said cassette is automatically played in the same manner as in the case of the cassette 1*a*.

The apparatus of the present invention is also capable of playing the entire cassettes 1*a*, 1*b*, 1*c* ..... in sequence automatically, irrespective of the above-described operation of playing a specific cassette or cassettes. In this case, the operation of playing the individual cassettes is the same as the above-described operation and will be described later.

The practical construction of each of the constitutional elements of the apparatus will be described hereunder with reference to FIGS. 2 and onwards.

Figure 2:
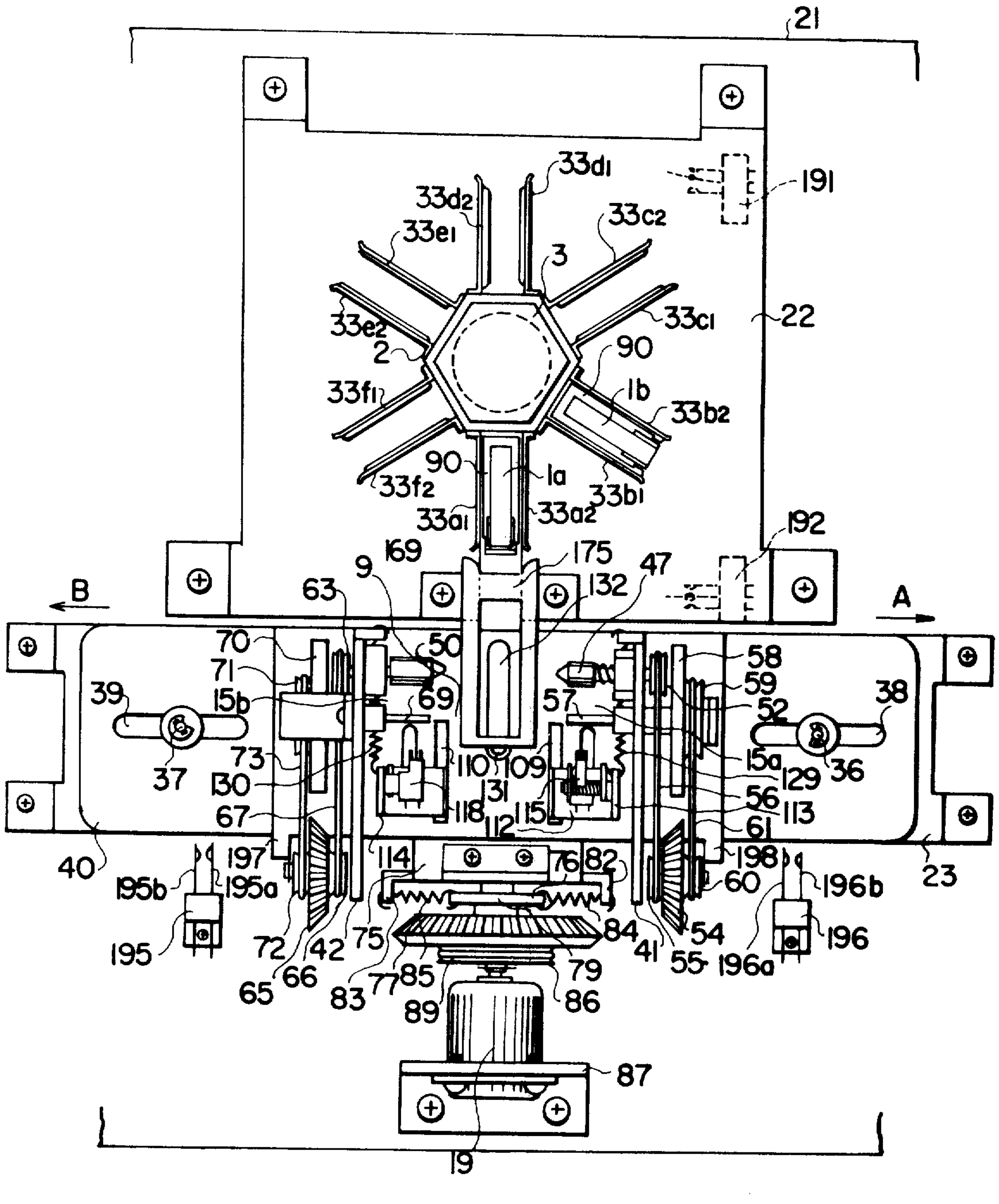
FIG. 2 is a top plan view of the apparatus.
Figure 3:
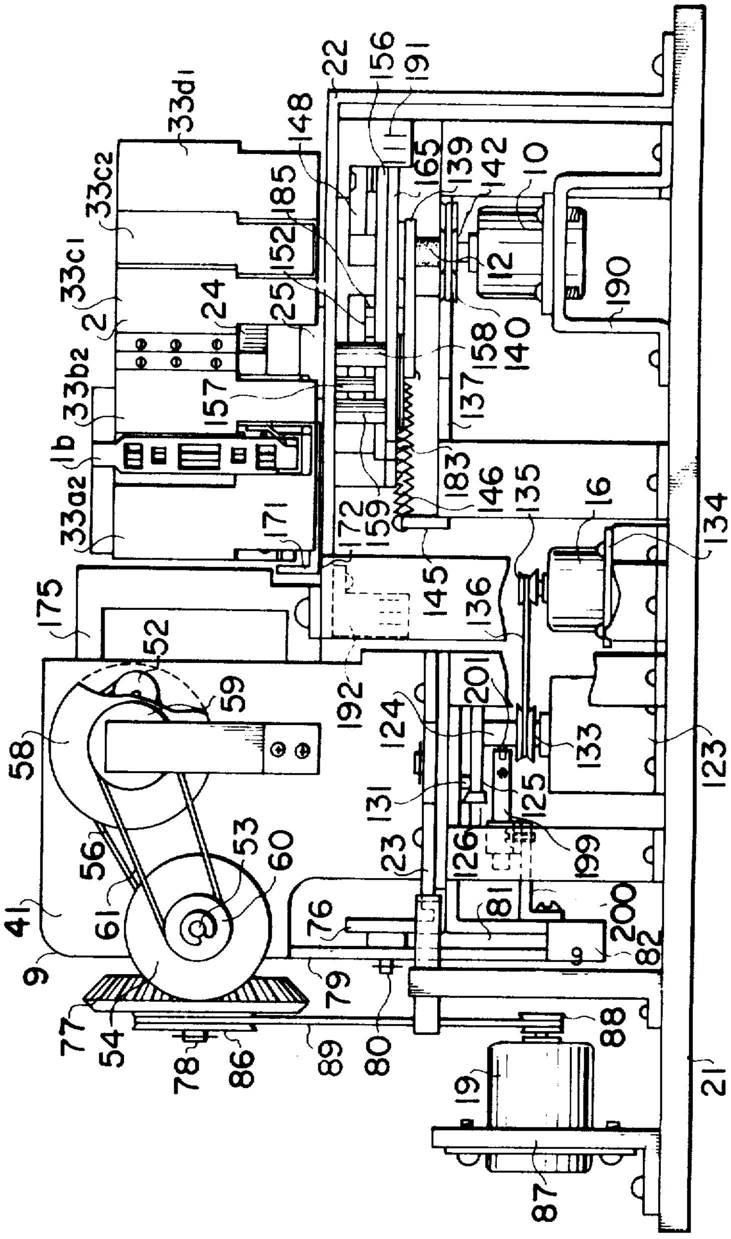
FIG. 3 is a side elevational view of the apparatus.

FIGS. 2 and 3 are a top plan view and a side view respectively of the mechanism of the apparatus according to the invention. The entire mechanism is mounted on a base plate 21, and a main bracket 22 and a subsidiary bracket 23 which are secured on said base plate 21.

Figure 6:
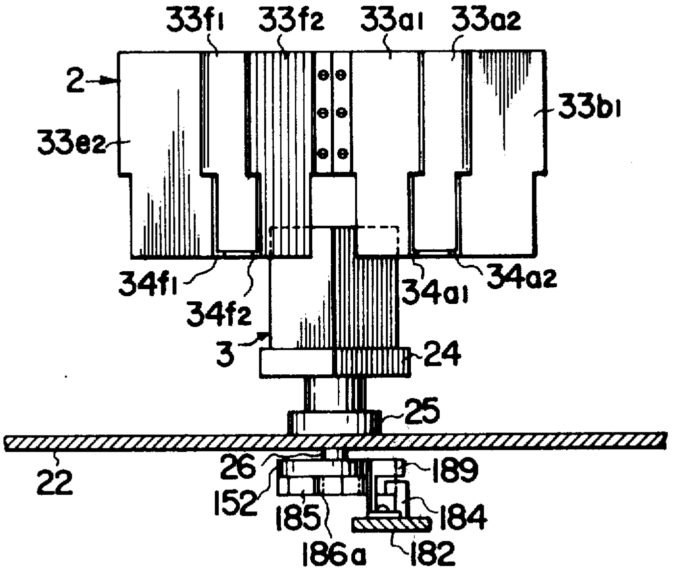
FIG. 6 is a side elevational view of the cassette mount mounted on the cassette selection detecting box.
Figure 7:
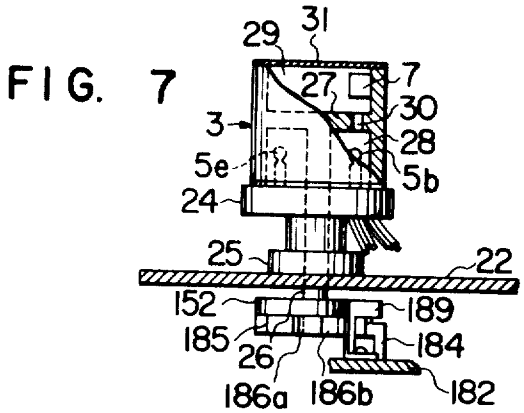
FIG. 7 is a side elevational view, partially in section, of the cassette selection detecting box.

First of all, at the center of the main bracket 22 is provided the cassette selection detecting box 3 which is mounted on a shaft 26 which is rotatably supported by a bearing having a hexagonal flange 24 at the top end thereof (FIGS. 6 and 7). The cassette selection detecting box 3 consists of a hexagonal hollow body which has an integral partition plate 27 (FIG. 7) in the center thereof and the outer profile of which is slightly smaller than the profile of the hexagonal flange 24. The partition plate 27 is secured to the shaft 26 and thus the cassette selection detecting box 3 is rotatable with said shaft 26.

Figure 8:
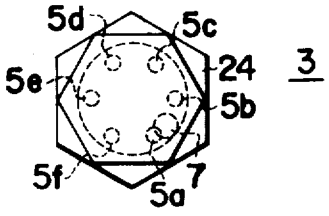
FIG. 8 is a top plan view showing the rotating state of the cassette selection detecting box.

On the top surface of the flange 24 of the bearing 25 are provided six lamps 5*a*, 5*b*, 5*c*, 5*d*, 5*e*, 5*f* (FIG. 8) in circumferentially equally spaced relation. These lamps are housed in the lower cavity 28 of the cassette selection detecting box 3. In the upper cavity 29 of the cassette selection detecting box 3 is provided the photoconductive element 7 at such a location that said photoconductive element 7 is opposed by each of the lamps 5*a* – 5*f* during rotation of the cassette selection detecting box 3. The partition plate 27 is provided with a hole 30 so that the light of each of the lamps 5*a* – 5*f* may be received by the light receiving surface of the photconductive element 7 therethrough.

Figure 1:
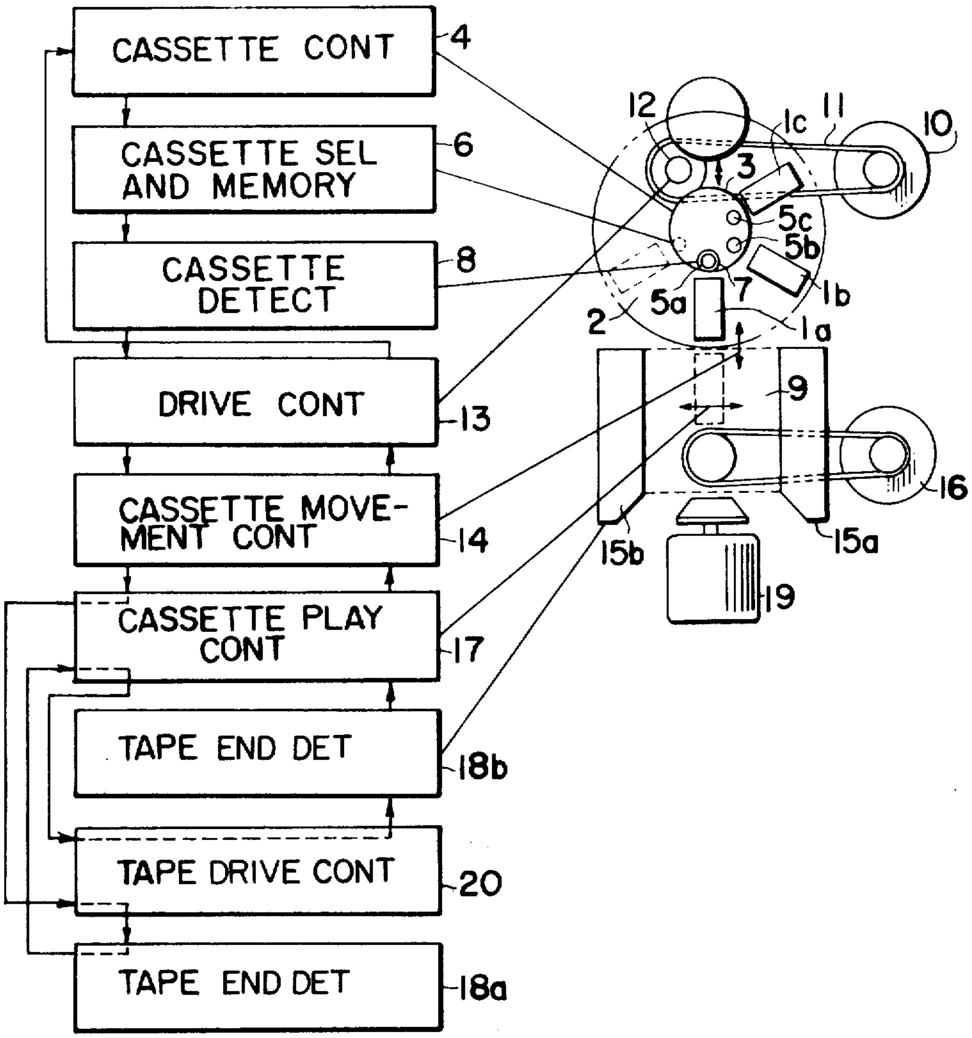
FIG. 1 is a system diagram showing the overall mechanism and electrical arrangement of an embodiment of the magnetic tape recording and reproducing apparatus according to the present invention.

The lamps 5*a* – 5*f* are included in the cassette selecting and memorizing unit 6 shown in FIG. 1 and are individually turned on when a specific cassettes or cassettes to be played are memorized by said unit 6. The photoconductive element 7 is included in the cassette detecting unit 8 shown in FIG. 1, to detect the specific cassette or cassettes to be played, by the light from the lamps 5*a* – 5*f*. When the internal resistance of the photoconductive element 7 is substantially decreased, a plunger is returned as will be described later, whereby the position of the idler 12 is shifted. In order to avoid a malfunction of the cassette detecting unit 8 caused by the photoconductive element 7, the top end of the cassette selection detecting box 3 is closed by a cover 31, so that the photoconductive element 7 will receive only the light from the lamps 5*a* – 5*f*.

Figure 5:
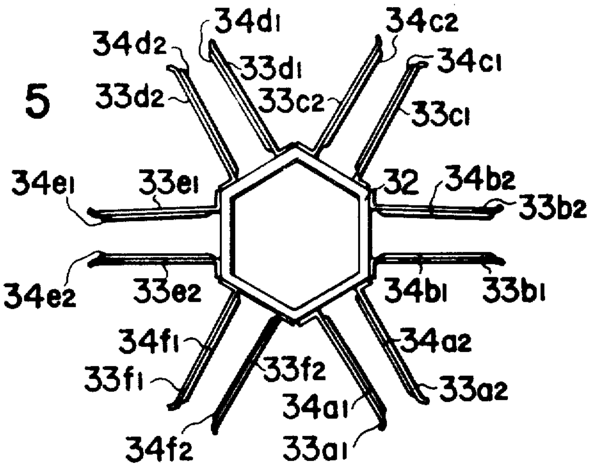
FIG. 5 is a top plan view of the cassette mount of the apparatus.

The cassette mount 2, as best shown in FIG. 5, comprises a hexagonal hollow frame member 32 sized so as to be fitted around the cassette selection detecting box 3 and six pairs of spring plates $33a_1$ and $33a_2$, $33b_1$ and $33b_2$, $33c_1$ and $33c_2$, $33d_1$ and $33d_2$, $33e_1$ and $33e_2$, $33f_1$ and $33f_2$, extending radially from the six planes of said hexagonal frame member 32 respectively, with one ends of the respective spring plates being connected to said frame member, the spring plates of each pair defining a space therebetween which is slightly larger than the thickness of the cassettes 1*a*, 1*b*, 1*c* ..... . The free ends of each pair of the spring plates are bent outwardly with respect to each other and the lower edges thereof are bent inwardly with respect to each other to form cassette holding lugs $34a_1$ and $34a_2$, $34b_1$ and $34b_2$, $34c_1$ and $34c_2$, $34d_1$ and $34d_2$, $34e_1$ and $34e_2$ or $34f_1$ and $34f_2$.

Each of the cassettes 1*a*, 1*b*, 1*c* ..... is mounted in the cassette mount 2, as it is held in a holder 90 shown in FIG. 23, in such a manner that the head insertion hole and the pinch role insertion hole thereof will be located outwardly with respect to the center of the cassette mount 2. The cassette holder 90 is a box-shaped body which is open at one side 91 and one longitudinal end 92 and which is so sized that the longitudinal width thereof is far shorter than the longitudinal length of the cassette and the width perpendicular to said longitudinal width is slightly shorter than the width of the latter. The inner surfaces of the main plates 93 and 94 of the holder 90 are stepped adjacent the open side 91 to form a space slightly wider than the other portion, so as to receive the largest thickness portion 107 of the cassette, and notches 95, 96 and 97, 98 are formed in the edges of the main plates 93 and 94 which defne the opening 91. Further, the main plates 93, 94 are provided with holes 99, 100, and notches 101 and 102 are formed in the edges thereof which define the opening 92.

Figure 24:
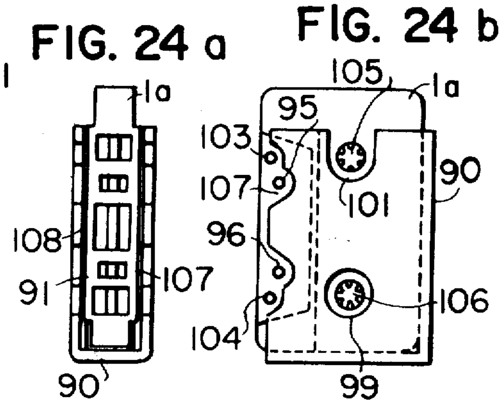

A cassette, e.g. the cassette 1*a*, is inserted in the holder 90 in such a manner that the end of the former from which a magnetic tape is inserted therein will project from the opening 91 of the latter, as shown in FIG. 24. When the cassette is inserted in the holder in the manner described, the capstan insertion holes 103 and 104 of the cassette 1a are located within the notches 95, 97 and 96, 98, and the reel shaft holes 105, 106 are located within the holes 99, 100 and the notches 101, 102, and further, the top end of the cassette 1a projects outwardly through the opening 92 of the holder 90.

The holders 90, respectively having the cassettes 1*a*, 1*b*, 1c ..... mounted therein in the manner described above, are mounted in the spaces between the spring plates $33a_1$ and $33a_2$, $33b_1$ and $33b_2$, $33c_1$ and $33c_2$, ..... of the cassette mount 2 respectively. In this case, the lateral position of each cassette is defined by the spring plates and the vertical position thereof is defined by the cassette holding lugs $34a_1$ and $34a_2$, $34b_1$ and $34b_2$, ..... or $34f_1$ and $34f_2$ of said spring plates. The top end of the cassette projects upwardly from the top ends of the spring plates $33a_1$ and $33a_2$, $33b_1$ and $33b_2$, ..... or $33f_1$ and $33f_2$.

Next, the constructions of the cassette playing section 9 and the mechanisms associated therewith will be explained.

Figure 9:
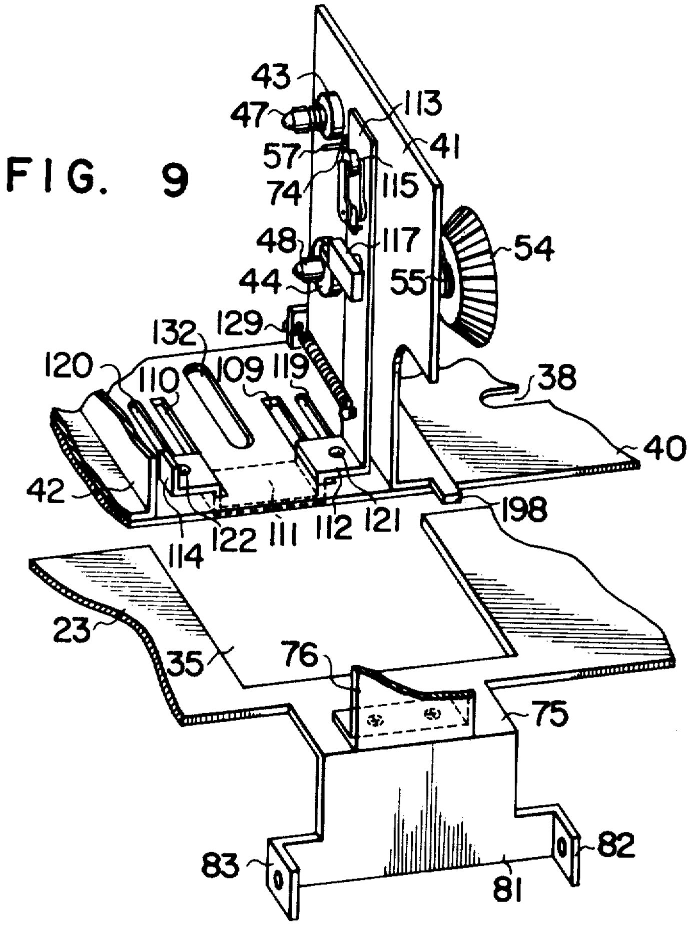
FIG. 9 is a partially exploded perspective view mainly showing one side of the cassette playing mechanism.

The cassette playing section 9, as shown for example in FIGS. 2 and 9, is provided on a sliding plate 40 which is slidably mounted on the subsidiary bracket 23, having a notch 35 formed in the center thereof, with pins 36, 37 provided on said subsidiary bracket 23 being received in slots 38, 39 formed in said sliding plate respectively.

Figures 11, 12:
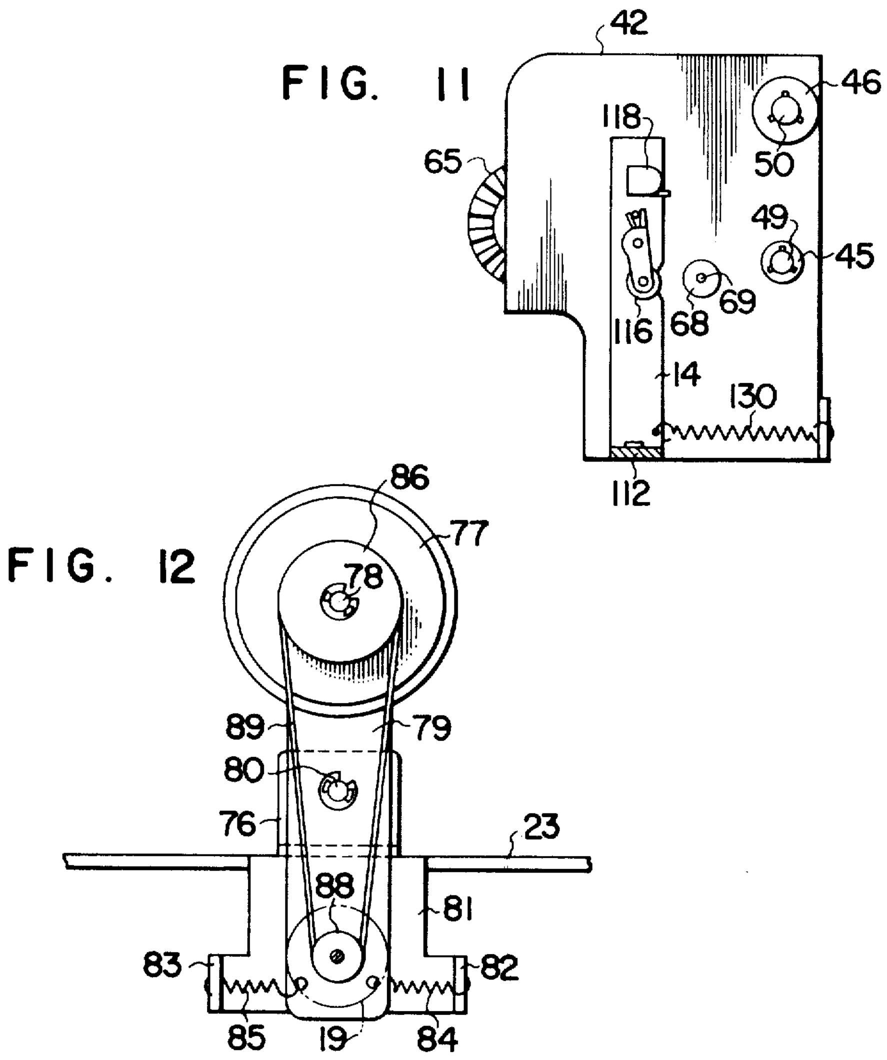
FIG. 11 is a side elevational view showing the other side of the cassette playing mechanism.
FIG. 12 is a side elevational view of a mechanism for transmitting a rotational force to the cassette playing mechanism.

Namely, two brackets 41 and 42 are fixed upright to the central portion of the upper surface of sliding plate 40 in opposed relation to each other with a predetermined space therebetween, and the first cassette playing mechanism 15a and the second cassette playing mechanism 15b are mounted on said upright brackets 41, 42 respectively. As best shown in FIGS. 9 and 11, inwardly projecting reel shafts 47, 48 and 49, 50 are rotatably supported on the upright brackets 41, 42 by means of bearings 43, 44 and 45, 46 respectively. On one of the reel shafts 47 on the upright bracket 41, which is a tape winding reel shaft, is mounted a pulley 52 integrally therewith coaxially with the axis 51 of said reel shaft 47. The pulley 52 is operatively connected with a pulley 55 by a belt 56, which pulley 55 is driven in frictional engagement with a bevel gear 54 rotatably mounted on the upright bracket 41 by a pin 53. On the upright bracket 41 is also rotatably supported a capstan 57 by means of a bearing 74. A flywheel 58 is mounted integrally on the capstan 57 for rotation therewith and a pulley 59 on the flywheel 58 is operatively connected with a pulley 60 by a belt 61 which pulley 60 is integral with the bevel gear 54. Thus, it will be seen that, when the bevel gear 54 is driven, the reel shaft 47 and the capstan 57 are driven simultaneously to feed the tape.

On the other hand, the reel shaft 49 on the upright bracket 42 similarly has a pulley 63 mounted thereon integrally coaxially with the axis 62 thereof, and said pulley 63 is operatively connected with a pulley 66 by means of a belt 67, which pulley 66 is driven in frictional engagement with a bevel gear 65 rotatably mounted on said upright bracket 42 by a pin 64. Further, a capstan 69 is rotatably supported on the upright bracket 42 by a bearing 68 and a flywheel 70, with a pulley 71 mounted thereon, is integrally mounted on said capstan 69. The pulley 71 is operatively connected with a pulley 72 on the bevel gear 65 by means of a belt 73. Thus, it will be seen that, when the bevel gear 65 is driven, the reel shaft 49 and the capstan 69 are rotated concurrently to feed the tape.

As shown in FIG. 12, a small bracket 76 is fixed to a lug 75 formed at the central portion of the subsidiary bracket 23 and a lever 79 is pivotably connected at the central portion thereof to said small bracket 76 by a pin 80. The lever 79 has a bevel gear 77 rotatably mounted on the top end thereof by means of a pin 78. The outer end of the lug 75 is flexed downwardly to form a vertically extending lug 81 and projections 82 and 83 are formed at the opposite ends of said downwardly flexed lug 81. Springs 84, 85 are provided between the projections 82, 83 and the lower end of the lever 79 respectively, so as to keep said lever 79 in a substantially vertical position.

The motor 19 is mounted on the base plate 21 by an angle 87 and a pulley 88 is mounted on the drive shaft of said motor. The pulley 86 on the bevel gear 77 is operatively connected to the pulley 88 of the motor 19. Therefore, the bevel gear 77 is driven by the drive of said motor 19.

The bevel gear 77 is brought into meshing engagement with the bevel gear 54 on the upright bracket 41 when the sliding plate 40 is slidingly moved to the left or in the direction or the arrow B, and is brought into meshing engagement with the bevel gear 65 on the upright bracket 42 when said sliding plate is slidingly moved to the right or in the direction of arrow A. In engagement with the bevel gear 54 or 65, the bevel gear 77 is urged against said bevel gear under the biasing force of the spring 84 or 83 which urges the lever 79. Namely, when the sliding plate 40 is moved in the direction of the arrow A, it is further moved slightly in said direction even after the bevel gear 54 is brought into engagement with the bevel gear 77, so that the lever 79 is rotated in a counterclockwise direction as viewed in FIG. 12. Therefore, the spring 85 is pulled by the lever 79 and the bevel gear 77 meshing with the bevel gear 54 is urged against the latter by the biasing force of the spring 85. On the other hand, when the sliding plate 40 is moved in the direction of the arrow A, the bevel gear 77 is similarly held in pressure engagement with the bevel gear 65 under the biasing force of the spring 84.

Since the bevel gear 77 engages the bevel gear 54 or 65 when the sliding plate 40 is selectively moved to the right or left, as described above, the drive of the motor 19 is transmitted to the reel shaft 47 and the capstan 57, or the reel shaft 49 and the capstan 69, through the bevel gear 77 and the bevel gear 54 or 65.

Figure 10:
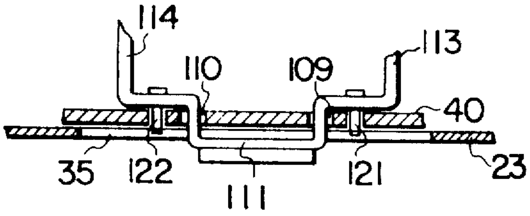
FIG. 10 is a front elevational view, partially in section, of the play shifting mechanism.

As shown in FIGS. 9 and 10, the sliding plate 40 is formed at the central portion thereof with slots 109, 110, and a head plate 112 is engaged through the slot 109, 110 with a central stepped portion 111 thereof extending along the underside of the sliding plate 40 and with the opposite arms 113, 114 thereof extending along the inside surfaces of the upright brackets 41, 42 respectively. On each of the arms 113, 114 of the head plate 112 are mounted a pinch roller 114 or 116 for cooperation with the capstan 57 or 69, and recording and reproducing head 117 or 118.

In order to facilitate a smooth sliding movement of the head plate 112 on the sliding plate 40, pins 121, 122 provided on said head plate 112 are received in slots 119, 120 formed in said sliding plate 40 and extending in the same direction as the slots 109, 110.

Figure 4:
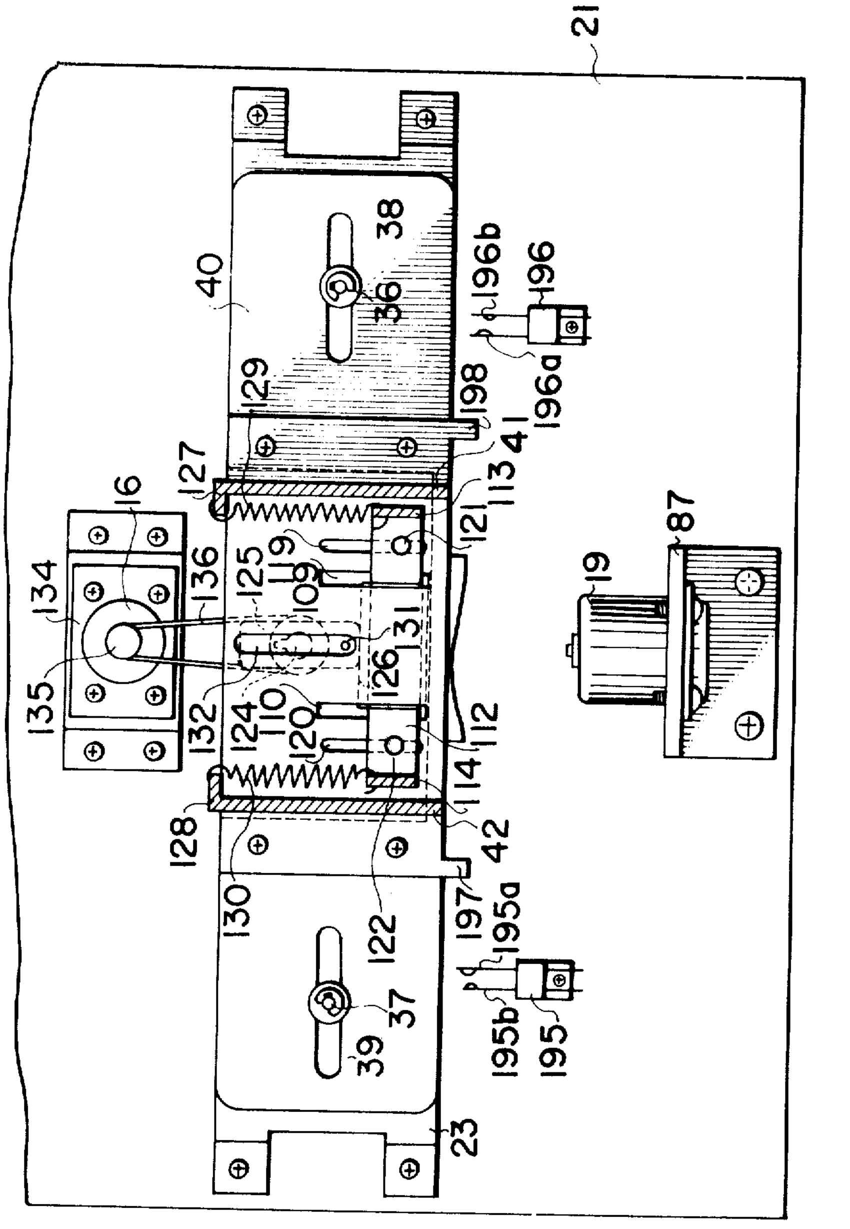
FIG. 4 is a top plan view, partially in section, of the play shifting mechanism of the apparatus.

As shown in FIGS. 3 and 4, a shaft 124 is vertically rotatably mounted on the base plate 21 by an angle 123 and a substantially rectangular cam 125 is integrally mounted on the top end of said shaft 124. The cam 125 has its edge 125*b*, perpendicular to its longitudinal edge 125*a*, shaped in an arcuate shape, and a downwardly flexed lug 126 extending from one side of the stepped portion 111 of the head plate 112 is urged against one end of said cam under the biasing forces of springs 129, 130 which are extended between said head plate 112 and projections 127, 128 formed on the upright brackets 41, 42 respectively. The cam 125 is provided with a pin 131 at one end of the upper surface thereof. This pin 131 extends upwardly through the notch 35 in the subsidiary bracket 23 to be received in a slot 132 formed in the center of the sliding plate 40.

The shaft 124 on which the cam 125 is mounted, has a pulley 133 integrally mounted thereon and this pulley 133 is operatively connected with a pulley 135 by a belt 136, which pulley 135 is mounted on the drive shaft of a low speed motor 16 mounted on the base plate 21 by an angle 134. Thus, the pulley 133 is driven from the motor 16. Therefore, when the motor 16 is set in motion, the cam 125 is driven and hence the head plate 112 is caused to move forwardly or backwardly by the edge of the cam 125 in engagement with the downwardly flexed lug 126 of said head plate 112, against or under the biasing forces of the springss 129, 130 and concurrently the sliding plate 40 is caused to slide to the left or right by the pin 131.

Namely, during one revolution of the cam 125, the head plate 112 is caused to make two reciprocal movements and the sliding plate 40 is caused to make one reciprocal movement. When the sliding plate 40 is located just at the center of its sliding stroke, the head plate 112 is located at the rear end of its stroke against the biasing forces of the springs 129, 130, whereas when the sliding plate 40 is located at the left or right hand end of its stroke, the head plate 112 is located at the forward end of its stroke under the biasing forces of the springs 129, 130, holding the pinch rollers 115, 116 in pressure contact with the capstans 57, 69 respectively.

The mechanism by which the cassette mounted in the cassette mount 2 is shifted to the cassette playing section 9 or the same is moved from said cassette playing section 9 back into the cassette mount 2, and the mechanisms associated therewith will be explained hereunder:

The mechanism for controlling the movement of the cassette is provided between the main bracket 22 and the base plate 21.

Figure 13:
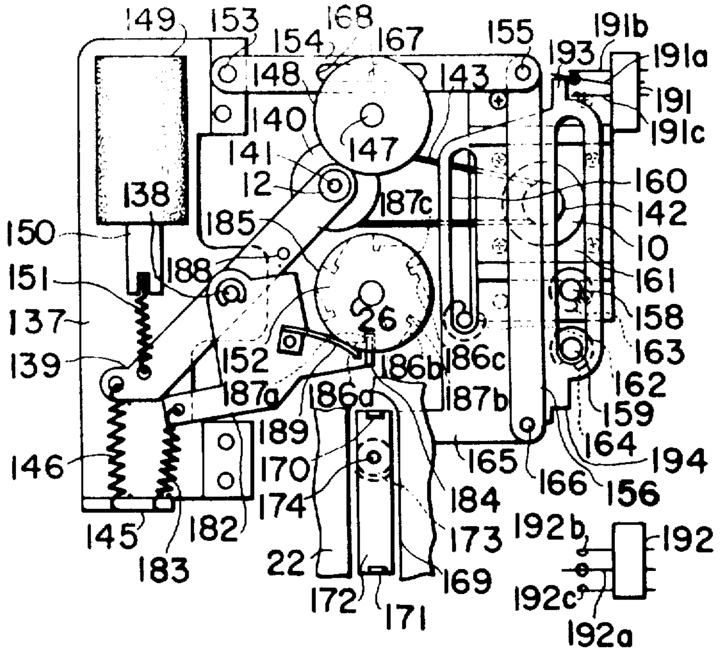
FIG. 13 is a top plan view showing the relative position of the rotating cassette mount and the mechanism for moving the carrier for transporting a cassette from said cassette mount to the cassette playing mechanism, particularly the relative position of said cassette mount and said mechanism in a stationary state.

Namely, as shown in FIG. 13, a shifting lever 139 is rotatably mounted at its center on a pin 138 provided on an auxiliary bracket 137 fixed on the base plate 21. A pulley 140 is rotatably mounted on one end of the shifting lever 139 by means of a pin 141. This pulley 140 is operatively connected by a belt 143 to a pulley 142 which is mounted on the drive shaft of the motor 10 which is mounted on the base plate 21 by an angle 190. Thus, the pulley 140 is driven from the motor 10. In the normal condition, the idler 12 which rotates integrally with the pulley 140, is held in pressure contact with a pulley 148 which is rotatably supported on the underside of the main bracket 22 by a pin 147, under the biasing force of a spring 146 which is extended between the shifting lever 139 and a projection 145 formed on the auxiliary bracket 137.

On the auxiliary bracket 137 is also mounted a plunger 149 and a spring 151 is extended between a plunger core 150 of said plunger 149 and the shifting lever 139. When the plunger core 150 is retracted upon actuation of the plunger 149, the shifting lever 139 is caused to make a pivotal movement in a clockwise direction through the spring 151 against the biasing force of the spring 146, whereby the idler 12 is disengaged from the pulley 148 and brought into pressure engagement with a pulley 152 which is integrally mounted on the shaft 26 of the cassette selection detecting box 3.

A swing lever 154 has one end thereof pivotally connected to the underside of the main bracket 22 by a pin 153, with the other end pivotally connected to one end of a link lever 156 by a pin 155. The other end of the link lever 156 is pivotally connected by a pin 166 to a sliding lever 165 which extends along the underside of the main bracket 22, with pins 157 and 158, 159 projecting downwardly from the underside of said main bracket 22 being received in slots 160, 161 formed in the former, for sliding movement in a direction of a line connecting the cassette mount 2 with the cassette playing section 9, and is held in position by washers 162, 163, 164 mounted on said pins 157, 158, 159 respectively.

The pulley 148 is provided with a pin 167 extending downwardly from the underside thereof, and the pin 167 is received in a slot 168 formed in the central portion of the swing lever 154. Thus, it will be seen that, when the pulley 148 is rotated, the swing lever 154 is caused to make a swinging motion about the pin 153 and hence the sliding lever 165 is caused to slide in a fore and aft direction through the link lever 156.

The main bracket 22 is formed with a slot 169 along the line connecting the shaft 26 of the cassette selection detecting box 3 with the center of the cassette playing section 9, and a cassette carrier 172 is disposed within said slot 169, said cassette carrier 172 being formed with upwardly projecting lugs 170, 171 at the opposite ends thereof and connected to an arm 173 of the sliding lever 165 by [illegible] pin 174. Therefore, when the pulley 148 is rotated, the cassette carrier 172 is caused to make a reciprocal movement between the cassette mount 2 and the cassette playing section 9 by the reciprocal sliding movement of the sliding lever 165. Namely, the cassette carrier 172 makes one reciprocal movement on each revolution of the pulley 148.

Figure 16:
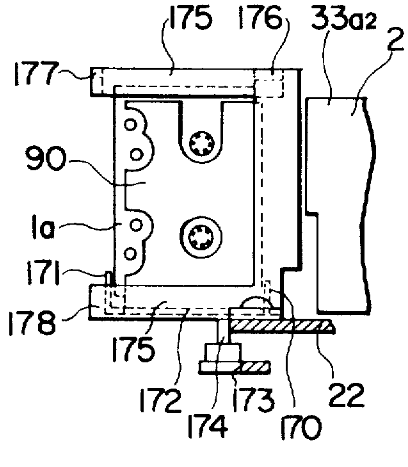
FIG. 16 is a side elevational view of the cassette which has been brought to the cassette playing mechanism on the carrier.
Figure 17:
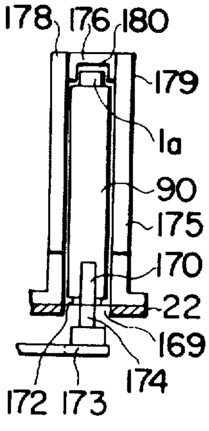
FIG. 17 is a back side view of the cassette and the carrier shown in FIG. 16.

As shown in FIGS. 2, 16, 17, etc., a guide 175 is fixedly mounted on the main bracket 22, extending along the line connecting the shaft 26 of the cassette selection detecting box 3 with the center of the cassette playing section 9, for guiding the cassette being shifted from the cassette mount 2 to the playing section 9 by the cassette carrier 172. This guide 175 consists of two U-shaped guide members 178, 179 coupled with each other at the top ends thereof by connecting members 176, 177. The space between the inside surfaces of the guide members 178 and 179 is slightly wider than the thickness of the cassette holder 90. The inside surfaces of the connecting members 176, 177 are recessed as at 180 so as to receive the portion of a cassette, e.g. the cassette 1a, projecting upwardly from said holder 90 when said cassette is mounted on the cassette carrier 172, together with the holder 90.

Figure 14:
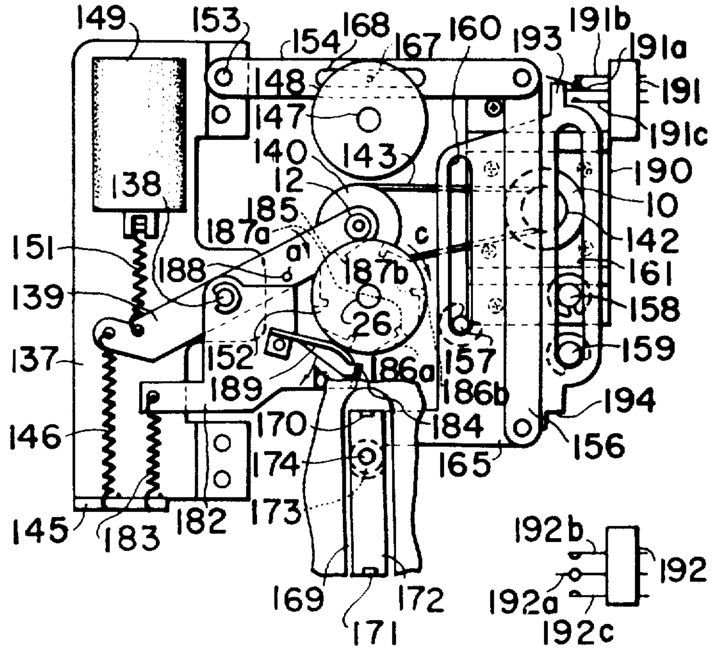
FIG. 14 is a top plan view similar to FIG. 13 but in the state wherein said cassette mount is rotating.

In addition to the major mechanisms described above, a mechanism is further provided in association with the cassette movement control mechanism, for stopping the cassette mount 2 in a predetermined position. As shown in FIGS. 14, 7, etc., this mechanism includes a locking lever 182 pivotably mounted on the pin 138 of the shifting lever 139 which carries the idler 12 and the pulley 140 thereon. The locking lever 182 is urged to rotate in a counter-clockwise direction by a spring 183 extended between it and the projection 145 of the auxiliary bracket 137. The locking lever 182 has a bent lug 184 formed at the forward end thereof, while a cam 185 is provided on the pulley 152, mounted on the shaft 26 of the cassette selection detecting box 3, for rotation therewith. The bent lug 184 is normally held in pressure engagement with the cam 185 on the line connecting the shaft 26 of the cassette selection detecting box 3 with the center of the playing section 9, under the biasing force of the spring 183. The cam 185 has the same number of recesses 186*a*, 186*b*, 186*c* ..... as the number of the cassettes 1*a*, 1*b*, 1*c* ..... which can be mounted in the cassette mount 2, formed in the peripheral surface thereof in equally spaced relation, and in each of the recesses 186*a*, 186*b*, 186*c* ..... is formed a groove 187*a*, 187*b*, 187*c* ..... for receiving the bent lug 184 of the locking lever 182. The positions of the grooves 187*a*, 187*b*, 187*c* ..... are so selected that they will be aligned with the centers of the spring plates $33a_1$ and $33a_2$, $33b_1$ and $33b_2$, $33c_1$ and $33c_2$, ..... when the cassette mount 2 is mounted on the cassette selection detecting box 3.

With the combination of the locking lever 182 and the cam 185 as described above, when the bent lug 184 of said locking lever 184 is engaged in any one of the grooves 187*a*, 187*b*, 187*c* ..... of the cam 185, the shaft 26 is held against rotation and thus the cassette mount 2 is locked against rotation.

The shifting lever 139 is provided with a pin 188. This pin 188 abuts against the locking lever 182 as the shifting lever 139 is caused to make a pivotal movement by the plunger 149 in a clockwise direction against the biasing force of the spring 146 and the idler 12 is brought into pressure contact with the pulley 152, and causes said locking lever to pivot in a clockwise direction, whereby the bent lug 184 is released from engagement with the cam 185.

The locking lever 182 has a resilient brake member 189 connected to a portion thereof, which can be placed in pressure engagement with the pulley 152. This brake member 189 is held in pressure contact with the pulley 152 when the bent lug 184 is received in any one of the grooves 187a, 187b, 187c ....., and is disengaged from the pulley 152 when the locking lever 182 is rotated in a clockwise direction. By providing the brake member 189, the following advantage can be obtained: Namely, when the pulley 152 and, therefore, the cassette mount 2 is brought to a halt from the rotating state, the brake member 189 is first brought into pressure contact with the pulley 152 to decelerate the same and then the bent lug 184 of the locking lever 182 engages one of the recesses 186*a*, 186*b*, 186*c* ..... and is received in one of the grooves 187*a*, 187*b*, 187*c* ....., whereby the engagement of said bent lug and said groove can be effected smoothly, without causing any shock.

Now, a switch mechanism for controlling the operations of the above-described mechanisms will be described with reference to FIGS. 3, 13, 14, 15, etc.

On the back side of the main bracket 22 are provided leaf siwtches 191, 192 each of which comprises a movable contact 191*a* or 192*a* and fixed contacts 191*b*, 191*c* or 192*b*, 192*c* arranged on both sides of said movable contact 191*a* or 192*a*. These leaf switches 191, 192 are controlled by a projection 193 and a step 194 formed on the sliding lever 165 respectively.

The movable contact 191a of the leaf switch 191 is normally held in contact with the fixed contact 191*c* but is brought into contact with the contact 191*b* by the projection 193 of the sliding lever 165, as shown in FIG. 13, when the cassette carrier 172 is held stationary in its returned position. On the other hand, the movable contact 192*a* of the leaf switch 192 is normally held in contact with the fixed contact 192*b* but is connected with the fixed contact 192*c* by being urged by the step 194 of the sliding lever 165 when the cassette is shifted to the center of the cassette playing section 9 by the cassette carrier 172.

On the base plate 21 are provided leaf switches 195, 196 each of which comprises a movable contact 195*a* or 196*a* and a fixed contact 195b or 196b, as shown in FIG. 2. The leaf switch 195 is activated when the sliding plate 40 is moved in the direction of the arrow B and the first playing mechanism 15*a* engages the cassette which has been shifted to the playing section 9 by the cassette carrier 172 and thereby the movable contact 195*a* is urged against the fixed contact 195*b* by a lug 197 of the sliding plate 40. The leaf switch 196 is closed when the sliding plate 40 is moved in the direction of the arrow A and the second playing mechanism 15*b* engages the cassette, and thereby the movable contact 196*a* is urged against the fixed contact 196*b* by a lug 198 of said sliding plate.

Figure 20:
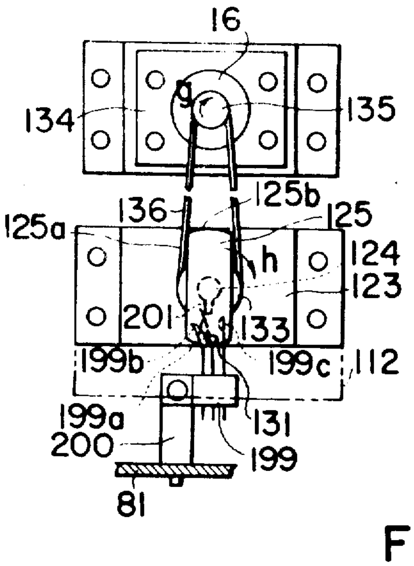
FIG. 20 is a top plan view showing the control mechanism for returning the cassette to the cassette mount by the carrier upon completion of the playing, particularly when the cassette playing mechanism is inoperative before playing.

Further, below the subsidiary bracket 23 is provided a leaf switch 199 which has a movable contact 199*a* and fixed contacts 199*b*, 199*c* arranged on both sides of said movable contact and which is mounted on a bent lug 81 of said subsidiary bracket 23 by a bracket 200, as shown in FIGS. 3, 20, etc. The movable contact 199*a* of this leaf switch 199 is operated by a pin 201 which is projecting from one side of the shaft 124 of the cam 125 toward the pin 131 on said cam. The movable contact 199*a* is normally held in contact with the fixed contact 199*c* but is brought into contact with the fixed contact 199*b* by being pushed by the pin 201 when the shaft 124 is rotated in a clockwise direction.

The electric circuit of the apparatus of this invention will be described with reference to FIGS. 25 and 26.

FIG. 25 shows a circuit which controls the operation of each of the mechanism described above and FIG. 26 shows a circuit which mainly selects a cassette to be played.

Referring first to FIG. 25, terminals 202 and 203 are those of a power source for the motors 10, 16, 19; terminals 204 and 203 are those of the power source for relays 205, 206 which controls said motors 10, 16, 19; and terminals 207 and 203 are those of the power source for the tape end detecting operation.

The movable contact 192*a* and fixed contact 192*b* of the leaf switch 192 and the motor 10 are connected in series between the terminals 202 and 203 through a power switch 208, and a movable contact $205a_1$ and fixed contact $205a_2$ of a switch 205*a* of the relay 205 and a movable contact $206a_1$ and fixed contact $206a_2$ of a switch 206*a* of the relay 206 are connected in series between the fixed contact 192*c* of the leaf switch 192 and the terminal 203.

Further, between the fixed contact 192*c* of the leaf switch 192 and the terminal 203 are connected a series circuit of a movable contact $205d_1$ and fixed contact $205d_3$ of a switch 205*d*, operatively associated with the switch 205*a*, and the motor 19; and a series circuit of a movable contact $206c_1$ and fixed contact $206c_3$ of a switch 206*c*, operatively associated with the switch 206*a*, and the motor 19.

Between the terminals 204 and 203 are connected a series circuit of the coil of the relay 205 and the leaf switch 196, and a series circuit of the coil of the relay 206 and the leaf switch 195, through a power switch 209 operatively associated with the power switch 208. A series circuit of a movable contact 210*a* and fixed contact 210*c* of a switch 210, operatively associated with the leaf switch 192, and a movable contact $205b_1$ and fixed contact $205b_3$ of a switch 205*b* of the relay 205, is connected in parallel to the leaf switch 196.

On the other hand, detectors for detecting the stoppage of rotation of the supply reel shafts 47, 50 of the first and second playing mechanisms 15*a*, 15*b*, e.g. tape end detecting circuits 211, 212 provided in the bearings 43, 46 for said respective shafts, are connected between the terminals 207 and 203. The tape end detecting circuits 211, 212 respectively include relays 213, 214 having switches 213*a* 214*a* whose movable contacts $213a_1$, $214a_1$ are connected with fixed contacts $213a_2$ and $214a_2$ respectively when the reel shafts 47, 50 are stationary.

A series circuit of the fixed contact $213a_2$ and movable contact $213a_1$ of the switch 213*a* of the relay 213, a fixed contact $206b_3$ and movable contact $206b_1$ of a switch 206*b* of the relay 206, and the motor 16, is connected between the fixed contact 192*c* of the leaf switch 192 and the terminal 203. Also connected between the fixed contact 192*c* of the leaf switch 192 and the terminal 203 is a series circuit of the movable contact $214a_1$ and fixed contact $214a_2$ of the switch 214*a* of the relay 214, a movable contact $205c_1$ and fixed contact $205c_3$ of a switch 205*c* of the relay 205, a movable contact 199*a* and fixed contact 199*c* of the leaf switch 199 and the motor 16. A fixed contact 199*b* of the leaf switch 199 is connected to a fixed contact 192*b* of the leaf switch 192.

In the cassette control circuit shown in FIG. 26, numerals 215, 216 designate power source terminals of the circuit. This circuit mainly includes cassette selection memories 6*a*, 6*b*, 6*c* ..... corresponding to the cassettes 1*a*, 1*b*, 1*c* ..... mounted in the cassette mount 2.

Between the terminals 215 and 216 are connected a cancel switch 221 and the cassette selection memories 6*a*, 6*b*, 6*c* ..... in parallel through a source switch 220 which is operatively associated with the power switches 208, 209. Since the memories 6*a*, 6*b*, 6*c* ..... are identical in construction, a description will be given only on the control of the memories using a play switch 217.

Aseries circuit of the coil of a relay 222 and the play switch 217 is connected between the terminals 215 and 216 through the source switch 220 and the cancel switch 221, and a movable contact $222a_1$ and fixed contact $222a_3$ of a switch 222*a* of the relay 222 are connected in parallel to the play switch 217.

On the other hand, a series circuit of a capacitor 223 and a movable contact 191*a* and fixed contact 191*c* of a leaf switch 191 shown in FIG. 13, etc. is connected between the terminals 215 and 216 through the source switch 220. A fixed contact 191*b* of the leaf switch 191 is connected between the source switch 220 and the cancel switch 221 through the coil of a relay 224 having a switch 224*a*.

Further, a series circuit of a movable contact $224a_1$ and fixed contact $224a_2$ of the switch 224*a* of the relay 224, a movable contact $222b_1$ and fixed contact $222b_3$ of a switch 222b of the relay 222 and the lamp 5*a* provided on the flange 24 of the bearing 25 which supports the cassette mount 2, etc., is connected between the terminals 215 and 216 through the source switch 220. An automatic switch 255 which is operatively connected to the corresponding switches of the other play memories 6*b*, 6*c* ....., is connected in parallel to the movable contact $222b_1$ and fixed contact $222b_3$ of the switch 222*b* of the relay 222.

Also connected between the terminals 215 and 216 through the source switch 220 are a series circuit of a resistor 226 and the photoconductive element 7 provided in the cassette selection detecting box 3, a series circuit of the emitter and collector of a transistor 227 and the coil of a relay 228 having a switch 228*a*, and a series circuit of the coil of the plunger 149 and a fixed contact $228a_2$ and movable contact $228a_1$ of the switch 228*a* of the relay 228. The junction of the resistor 226 and the photoconductive element 7 is connected to the base of the transistor 227.

The apparatus of the invention constructed as described above operates in the following manner: First of all, when the apparatus is inoperative, the plunger 149 is held in a non-energized position as shown in FIG. 13. Therefore, the shifting lever 139 is held in the position shown in FIG. 13 under the biasing force of the spring 146 and the idler 12 is held in pressure contact with the pulley 148. The locking lever 189 is also held in the position shown under the biasing force of the spring 183 and the brake member 189 is urged against the pulley 152, and further the bent lug 184 is received, for example, in the groove 187 in the notch 186a of the cam 185, holding the cassette selection detecting box 3 as well as the cassette mount 2 against rotation.

On the other hand, the sliding lever 165 is in its retracted position, since the pin 167 on the pulley 148 is in the position shown in FIG. 13, and hence the movable contact 191*a* of the leaf switch 191 is connected with the fixed contact 191*b* by the projection 193 of said sliding lever. The cassette carrier 172 is also held in its retracted position and, even if the cassette mount 2 is rotated and the cassette 1*a*, 1*b*, 1*c* ..... or 1f is located between the projections 170 and 171 of said cassette carrier 172, said cassette is not allowed to pass through along with the holder 90.

As shown in FIG. 20, the cam 125 is in a position, with the longitudinal edge 125*a* thereof extending in parallel to the line connecting the shaft 26 with the center of the playing section 9. Therefore, the head plate 112 is held in its forwarded position by being urged by the edge 125*b* of the cam and the movable contact 199*a* of the leaf switch 199 is held in contract with the fixed contact 199*b* by the pin 201 on the shaft 124.

Further, the sliding plate 40 is held stationary at the center of its stroke by the pin 131 on the cam 125 and hence the leaf switches 195 and 196 are held open.

When the power switches 208 and 209, shown in FIG. 25, are closed under the condition described, a current flows through the motor 10 to actuate the same, since the movable contact 192*a* of the leaf switch 192 is normally connected with the fixed contact 192*b*, and also a current flows through the plunger 149 through the switch 228*a* of the relay 228, as shown in FIG. 26, whereby the plunger 149 is energized. As a result, the shifting lever 139 is caused to make a pivotal movement in the direction of the arrow a as shown in FIG. 14 and the idler 12 is brought into pressure contact with the pulley 152 from the pulley 148. Incident to the pivotal movement of the shifting lever 139 in the direction of the arrow *a*, the pin 188 thereon causes the locking lever 182 to make a pivotal movement in the direction of the arrow *b*, so that the bent lug 184 of said locking lever is released from engagement with the groove 187*a* and the notch 186*a* of the cam 185 and the brake member 189 is disengaged from the pulley 152, providing for rotation of the cassette mount 2 together with the cassette selection detecting box 3. Since the motor 10 is set in motion and the idler 12 is brought into pressure contact with the pulley 152, the cassette mount 2 and the cassette selection detecting box 3 are integrally rotated in a clockwise direction or in the direction of the arrow *c*.

When the play switch 217 of the cassette selection memory 6*a*, shown in FIG. 26, is pressed during rotation of the cassette mount 2 and the cassette selection detecting box 3, the relay 222 is energized and the movable contacts $222a_1$, $222b_1$ of the switches 222*a*, 222*b* are connected with the fixed contacts $222a_3$, $222b_3$ respectively. Therefore, the relay 222 is self-held by the switch 222*a*, even if the pressure is removed from the switch 217. Further, a current flows to the lamp 5*a* through the switch 224*a* from the switch 222*b*, to turn it on.

When the photoconductive element 7 in the cassette selection detecting box 3 is located right above the lamp 5*a* during rotation of said box, the light of the lamp is received by the photoconductive element 7 through the hole 30 formed in the partition plate 27, with the result that the resistance of said photoconductive element sharply decreases. Therefore, the base current of the transistor 227 increases and the current flows through the collector thereof. Thus, the relay 228 is actuated and the movable contact $228a_1$ of the switch 228*a* is switched, whereby the plunger 149 is de-energized.

Upon de-energization of the plunger 149, the plunger 149, the shifting lever 139 is returned to its original position, shown in FIG. 13, under the biasing force of the spring 146 and the locking lever 182 is also returned to its original position under the biasing force of the spring 183. In the return movement of the locking lever 182, the brake member 189 first contacts the peripheral surface of the pulley 152 with pressure and then the bent lug 184 moves into the notch 186*a* and is received in the groove 187*a* at the same time when it is caught by the edge of said notch 186*a*.

Since the brake member 189 is pressed against the peripheral surface of the pulley 152 before the bent lug 184 engages the notch 186*a*, as stated above, the rotation of the cassette mount 2 and the cassette selection detecting box 3 is braked and in no cases will the bent lug 184 hit strongly the edge of the notch 186*a*. When the rotation of the cassette mount 2 and the cassette selection detecting box 3 has been stopped in the manner described upon turning on of the lamp 5*a*, the cassette 1*a* held between the spring plates $33a_1$ and $33a_2$ is located opposite to the groove 187*a* of the cam 185 and the bent lug 184 is received in the groove 187*a* on the line connecting the shaft 26 with the center of the playing section 9. Namely, the cassette mount 2 is located in the position shown in FIG. 2 and the cassette is located just above the cassette carrier 172 as shown in FIGS. 16 and 17.

Figure 15:
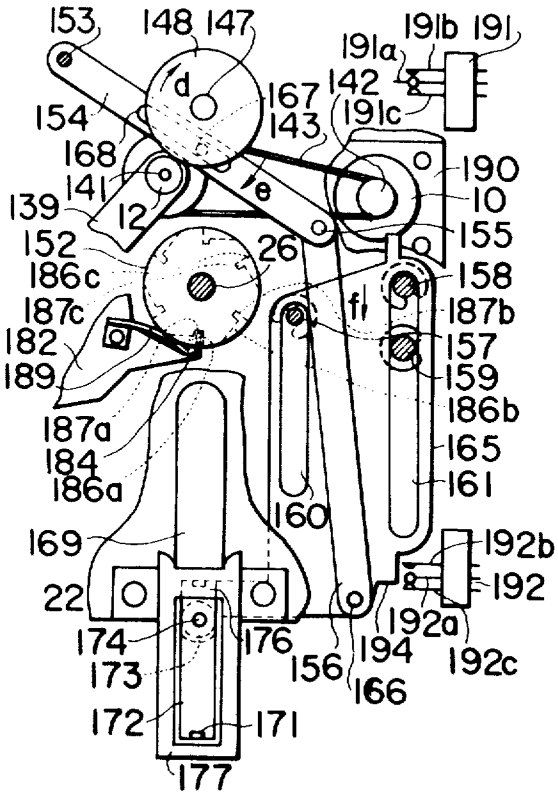
FIG. 15 is a top plan view of the principal portion of the mechanism of FIG. 13 in a state after the cassette carrier has been moved.

By the engagement of the bent lug 184 of the locking lever 139 with the groove 187*a*, the cassette mount 2 can be positioned positively and is firmly held in its position against rotation. The switch 192 is in its original position when the idler 12 is in pressure contact with the pulley 148. Therefore, the pulley 148 is rotated in the direction of the arrow *d* as shown in FIG. 15 and the pin 167 on said pulley also makes a rotation about the center of said pulley. The swing lever 154 is caused to make a pivotal movement in the direction of the arrow *e* by the pin 167 and consequently the sliding lever 165 is moved forward or in the direction of the arrow *f* along with the link lever 156.

When the sliding lever 165 is moved in the direction of the arrow *f*, the movable contact 191a of the leaf switch 191 is allowed to return to its original position and brought into contact with the fixed contact 191*c*, so that the capacitor 223 is charged. As the sliding lever 165 moves further forward and the cassette 1*a* is carried to the center of the playing section 9 on the carrier 172, the movable contact 192*a* of the leaf switch 192 is switched from the fixed contact 192*b* to the fixed contact 192*c* by the step 194 of the sliding lever 165, so that the power circuit of the motor 10 is broken and the motor 10 is stopped. At the same time, a current is supplied to the motor 16 through the movable contact 192*a* and fixed contact 192*c* of the leaf switch 192, the movable contact $205a_1$ and fixed contact $205a_2$ of the switch 205*a* of the relay 205 and the movable contact $206a_1$ and fixed contact $206a_2$ of the switch 206*a* of the relay 206. Thus, the motor 16 is set in motion and the pulley 135 is rotated in the direction of the arrow *g* from the position shown in FIG. 20.

The drive of the motor 16 is transmitted through the belt 136 to the pulley 133. The pin 201 and the cam 125 are rotated, together with the shaft 124, in the direction of the arrow *h*, which is the same direction as the rotating direction of the pulley 135, and the movable contact 199*a* of the leaf switch 199 is switched from the fixed contact 199*c* to the fixed contact 199*a* by the rotating pin 201. Further, the pin 131 is also rotated by the rotating cam 125, so that said pin urges the edge of the slot 132 formed in the sliding plate 40, causing said sliding plate to slide in the direction of the arrow B in FIG. 2.

Figure 18:
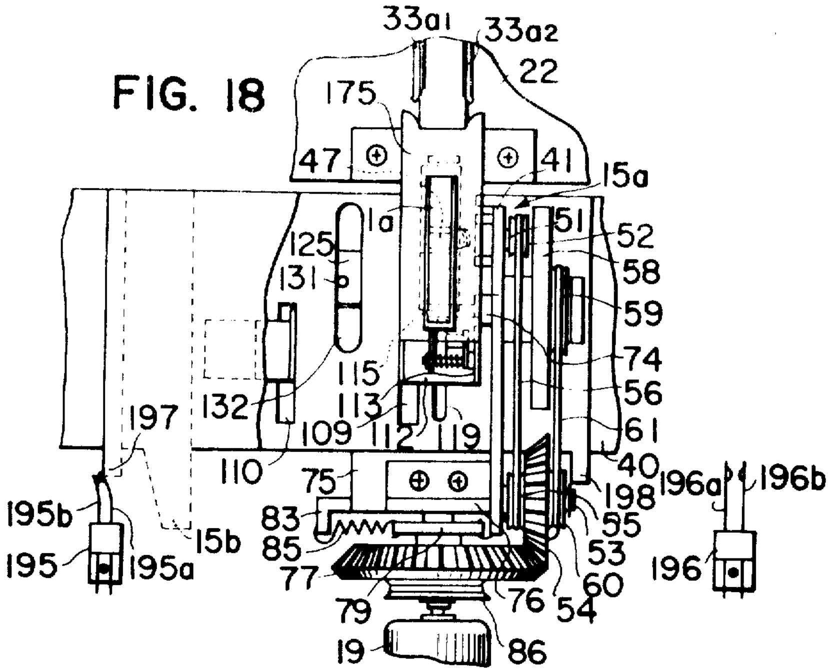
FIG. 18 is a top plan view showing the state of the cassette being played by the first playing mechanism.
Figure 21:
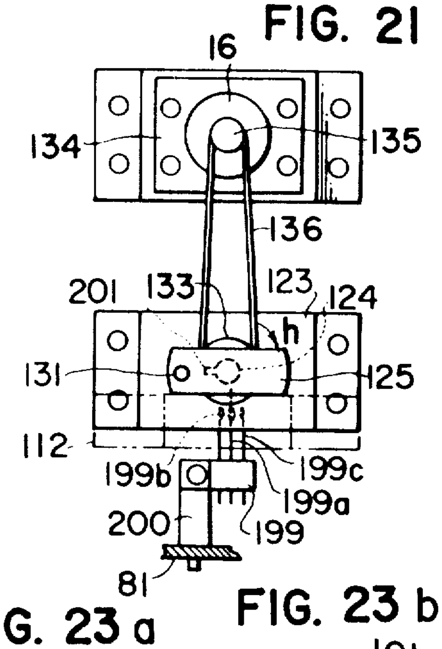
FIG. 21 is a top plan view of the control mechanism shown in FIG. 20, in the state wherein the cassette is being played by the first playing mechanism.

When the cam 125 is rotated about 90° from the stationary position of FIG. 20, as shown in FIG. 21, the movable contact 195*a* of the leaf switch 195 is pushed by the lug 197 of the sliding plate 40 and brought into contact with the fixed contact 195*b*, and the relay 206 is connected to the power source and excited by the current from said power source. The switches 206*a*, 206*b* and 206*c* of said relay 206 are switched and particularly the movable contact $206a_1$ of the switch 206*a* if disconnected from the fixed contact $206a_2$, whereby the motor 16 is stopped and the sliding plate 40 is held stationary in the position shown in FIG. 18. In this position of the sliding plate 40, the reel shafts 47, 48 and the capstan 57 of the first playing mechanism 15*a* are inserted into the reel shaft holes 105, 106 and the capstan insertion hole 103 of the cassette 1*a* through the notch 101, the hole 99 and the notch 95 of the holder 90 respective as shown in FIG. 18, which cassette 1a has previously been carried by the carrier 172 from the cassette mount 2 to the playing section 9 and positioned in said playing section by the guide 175 as shown in FIGS. 16 and 17. Thus, the first playing mechanism 15*a* is engaged with the cassette 1a.

On the other hand, as the cam 125 rotates, the edge 125*b* thereof is disconnected and the longitudinal edge 125*a* is connected with the stepped portion 126 of the head plate 112 as shown in FIG. 21, which head plate 112 is urged against the cam 125 under the biasing forces of the springs 129, 130 as shown in FIG. 4. As a result, the head plate 112 slides in the direction of the arrow *i* in FIG. 18 or towards the cassette 1*a*, under the biasing forces of said springs 129, 130 and the head 117 and the pinch roller 115 are inserted into the cassette 1*a*. The head 117 is pressed against the tape and the pinch roller 115 is pressed against the capstan 57, pinching the tape therebetween.

The sliding movement of the sliding plate 40 also brings the bevel gear 54 mounted thereon into engagement with the bevel gear 77.

The motor 19 is set in motion by a current supplied thereto through the leaf switch 192 when the relay 206 is excited and the movable contact $206c_1$ of the switch 206*c* of said relay is switched to contact the fixed contact $206c_3$. The drive of the motor 19 is transmitted to the reel shaft 47 and the capstan 57, at substantially the same time when it is transmitted to the bevel gears 54, 77, and thus the tape in the cassette 1*a* is fed at a constant speed.

The tape end detecting circuit 211, when the reel shaft 48 is inoperative, supplies a current to the relay 213 therethrough to excite the same and the movable contact $213a_1$ of the switch 213*a* of said relay is held in contact with the fixed contact $213a_2$ and the movable contact $206b_1$ of the switch 206*b* of the relay 206 is held in contact with the fixed contact $206b_3$. The motor 16 is to be energized at the same time as the excitation of the relay 206 but, since the motor 19 is set in motion by the switch 206*c* at the same time as the switch 206*b* is actuated, to feed the tape and the supply reel shaft 48 is driven, the power circuit of the relay 213 of the tape end detecting circuit 211 is instantaneously broken and the movable contact $213a_1$ of the switch 213*a* is returned to contact with the fixed contact $213a_3$ to break the power circuit of the motor 16. Thus, the sliding plate 40 is retained in its position.

By the above-described operation, the normal feed playing of the tape in the cassette 1*a* is effected by the first playing mechanism 15*a*.

Now, the operation to effect the reverse feed playing of the tape of the cassette 1a will be described hereunder:

When the normal feed playing of the tape in the cassette 1*a* by the first playing mechanism 15*a* has been ended, the tape stops running as the tape end is secured to the reel hub. In this case, the rotation of the winding reel shaft 47 is stopped due to slippage occurring between the pulley 52 and the bevel gear 54 which compose a frictional transmission mechanism. The feed of the tape is also stopped due to a slippage between it and the capstan 57.

When the supply reel shaft 48 stops rotating, the operation of the tape end detecting circuit 211 is switched by a detector provided, for example, in the bearing 44 for said shaft and the relay 213 is energized. Upon energization of the relay 213, the movable contact $213a_1$ of the switch 213*a* of said relay is switched over the fixed contact $213a_2$, so that a current is supplied to the motor 16 through the switch 206*b* of said relay 206. As such, the motor 16 is set in motion at first when the playing of the tape has ended.

By the drive of the motor 16, the cam 125 is rotated further in the direction of the arrow *h* from the position shown in FIG. 21 and the head plate 112 is returned to the original stationary position by the other edge 125*b* of the cam 125 against the biasing forces of the springs 129, 130, and at the same time, the head 117 and the pinch roller 115 are disengaged from the cassette 1*a*.

Concurrently with the above-described operation, the pin 131 on the cam 125 causes the sliding plate 40 to slide in the direction of the arrow A past the original stationary position. As a result of the sliding movement of the sliding plate 40 in the direction of the arrow A from the position shown in FIG. 18, the engagement between the cassette 1*a* and the first playing mechanism 15*a* is released and at the same time, the leaf switch 195 is opened. The relay 206 is returned to its original position and the motors 16, 19 are stopped by the switches 206*b*, 206*c* respectively. However, since the movable contact $206a_1$ of the switch 206*a* is again connected with the fixed contact $206a_2$, the current is continuously supplied to the motor 16 through the switch 206*a* instead of the switch 206*b*, so that the cam 125 is further rotated and the sliding plate 40 is further moved in the direction of the arrow A.

When the cam 125 has been rotated to a point about 270° from its initial stationary position, the movable contact 196*a* of the leaf switch 196 is pushed by the lug 198 of the sliding plate 40 and connected with the fixed contact 196*b*. The relay 205 is connected to and energized by the current from the power source and the switches 205*a*, 205*b*, 205*c* thereof are switched and particularly the movable contact $205a_1$ of the switch 205*a* is disconnected from the fixed contact $205a_2$, whereby the motor 16 is stopped and the sliding plate 40 is held stationary in the position shown in FIG. 19.

Figure 19:
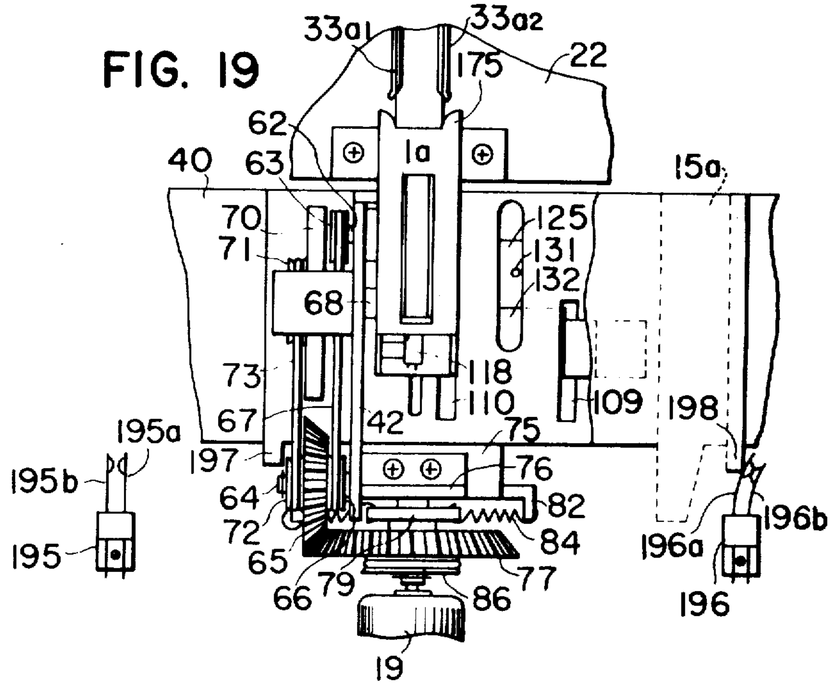
FIG. 19 is a top plan view showing the state of the cassette being played by the second playing mechanism.

In this position of the sliding plate 40, as shown in FIG. 19, the reel shafts 49, 50 and the capstan 69 of the second playing mechanism 15$b$ are inserted into the cassette 1$a$, as in the case of the first playing mechanism 15$a$ but from the opposite side of said cassette 1.

On the other hand, the rotation of the cam 125 causes the head plate 112 to slide in the direction of the arrow $i$ again, under the biasing forces of the springs 129, 130. Consequently, the head 118 and the pinch roller 116 are inserted into the cassette 1a and pressed against the tape and the capstan 69, with the tape interposed between said pinch roller and said capstan.

Furthermore, the bevel gear 65 mounted on the sliding plate 40 is brought into meshing engagement with the bevel gear 77 and at the same time, the drive of the motor 19, which is driven by the current supplied thereto from the power source through the movable contact 205$d_1$ and fixed contact 205$d_3$ of the switch 205$d$ of the relay 205, is transmitted to the reel shaft 49 and the capstan 69. Thus, the tape in the cassette 1$a$ is fed at a constant speed.

Similar to the tape end detecting circuit 211, the tape end detecting circuit 212 supplies a current to the relay 214 to energize the same and hold the movable contact 214$a_1$ of the switch 214$a$ in contact with the fixed contact 214$a_2$ when the reel shaft 50 is inoperative, and a current is to be supplied to the motor 16 at the same time when the movable contact 205$c_1$ of the switch 205$c$ of the relay 205 is switched to be fixed contact 205$c_3$ and hence said relay 205 is energized. However, since the motor 19 is set in motion by the switch 205$d$ at the same time as the switch 205$c$ is switched, to feed the tape and to rotate the supply reel shaft 50, the power circuit of the relay 214 of the tape end detecting circuit 212 is instantaneously broken, whereby the movable contact 214$a_1$ of the switch 214$a$ is again brought into contact with the fixed contact 214$a_3$, breaking the power circuit of the motor 16. Therefore, the sliding plate 40 is retained in its position in which the second playing mechanism 15$b$ is held in engagement with the cassette 1a and the tape of the cassette 1$a$ is fed.

By the above-described operation, the reverse feed playing by the second playing mechanism 15$b$ is automatically effected successively after the normal feed playing by the first playing mechanism 15$a$.

When the reverse feed playing of the cassette 1$a$ has been ended, the tape stops running since the end of the tape is secured to the reel hub. In this case, the rotation of the winding reel shaft 49 is stopped due to a slippage occurring between the pulley 63 and the bevel gear 65 which compose a frictional transmission mechanism, and the tape is held stationary due to a slippage between it and the capstan 69, similar to the case of the first playing mechanism 15$a$.

By the stoppage of rotation of the supply reel shaft 50, the operation of the tape end detecting circuit 212 is switched by the detector provided, for example, in the bearing 46 for said shaft, and the relay 214 is energized. As a result, the movable contact 214$a_1$ of the switch 214$a$ of the relay 214 is switched over to the fixed contact 214$a_2$ and the current is supplied from the power source to the motor 16 through the switch 205$c$ of said relay 205 and the movable contact 199$a$ and fixed contact 199$c$ of the leaf switch 199, to set said motor in motion.

Figure 22:
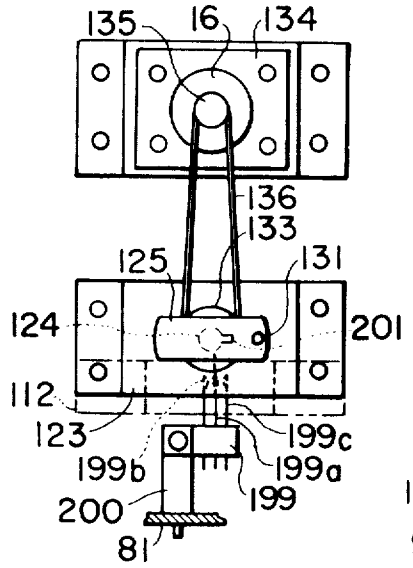
FIG. 22 is a top plan view of the control mechanism of FIG. 20, in the state wherein the cassette is being played by the second playing mechanism.

The drive of the motor 16 is transmitted to the cam 125 to cause it to rotate further in the direction of the arrow $h$ from the position shown in FIG. 22. The head plate 112 is caused to return to its original stationary position by one of the edges 125$b$ of said rotating cam 125, against the biasing forces of the springs 129, 130 and at the same time, the head 118 and the pinch roller 116 are disengaged from the cassette 1$a$.

Concurrently with the above-described operation, the pin 131 on the cam 125 causes the sliding plate 40 to slide in the direction of the arrow B, whereby the engagement between the cassette 1$a$ and the second playing mechanism 15$b$ is released and the leaf switch 196 is opened. However, the relay 205 continues its operation even after the leaf switch 196 is opened, because it is self-held by the switch 205$b$ through the switch 210 through the switch 210, so that the sliding plate 40 is continuously moved in the direction of the arrow B.

When the sliding plate 40 has returned to its original stationary position or when the pin 201 on the shaft 124 of the cam 125 has been returned to its original position shown in FIG. 20, the movable contact 199$a$ of the leaf switch 199 is switched from the fixed contact 199$c$ to the fixed contact 199$b$ by said pin 201, so that the power circuit of the motor 16 is broken and the sliding movement of the sliding plate 40 is stopped. At the same time, the current is supplied to the motor 10 to set it in motion.

The drive of the motor 10 is transmitted to the idler to rotate the pulley 148 further in the direction of the arrow $d$. The swing lever 154 is caused to make a pivotal movement in a direction opposite to the direction of the arrow $e$ and the sliding lever 165 is caused to make a sliding movement in a direction opposite to the direction of the arrow $f$ to return to its original stationary position shown in FIG. 13. The return movement of the sliding lever 165 causes the carrier 172 to move the cassette 1$a$ out of the playing section 9 and store the same between the spring plates 33$a_1$ and 33$a_2$ of the cassette mount 2.

Further, incident to the return movement of the sliding lever 165, the movable contact 192$a$ of the leaf switch 192 is again brought into contact with the fixed contact 192$b$ and at the same time, the switch 210 is opened. Thus, the power circuit of the motor 10, connected to the power source through the switch 205$c$ of the relay 205 and the leaf switch 199, is broken, but the current is continuously supplied to the motor 10 through the movable contact 192$a$ and fixed contact 192$b$ of the leaf switch 192, so that the return movements of the sliding lever 165, etc. are continued. When the sliding lever 165 has been returned to the position shown in FIG. 13, the movable contact 191$a$ of the leaf switch 191 is switched to the fixed contact 191$b$, so that the charge stored in the capacitor 223 is discharged through the relay 224. The relay 224 is energized by the discharge current of the capacitor 223 and the movable contact 224$a_1$ of the switch 224$a$ of said relay is disconnected from the fixed contact 224$a_2$, breaking the power circuit of the lamp 5$a$.

The lamp 5$a$ is turned off and the transistor 227 is cut off. The relay 228 is de-energized and the plunger 149 is energized by the current supplied thereto through the movable contact 228$a_1$ and fixed contact 228$a_2$ of the switch 228$a$ of the relay 228. As a result, the shifting lever 139 is caused to make a pivotal movement in the direction of the arrow $a$ as shown in FIG. 13, against the biasing force of the spring 146. The idler 12 is disengaged from the pulley 148 and urged against the pulley 152.

On the other hand, the locking lever 182 is caused to make a pivotal movement in the direction of the arrow *b*, by the pivotal movement of the shifting lever 139, whereby the braking force applied to the pulley 152 is released and the cam 185 is set free to rotate. Therefore, the cassette mount 2 and the cassette selection detecting box 3 are rotated in the direction of the arrow *c*.

In this case, the capacity of the capacitor 223 and the impedance of the coil of the relay 224 are so selected that the relay 224 operated by the discharge current of said capacitor 223 becomes inoperative immediately after the cassette mount 2 and the cassette selection detecting box 3 start rotating. Therefore, it will be understood that the lamp 5*a* is turned on again immediately after the cassette mount 2 and the cassette selection detecting box 3 start rotating.

If the play switch 217' of the cassette selection memory 6*b*, for example, is pressed in the process of playing of the cassette 1*a*, the lamp 5*b* is held on, similar to the case of the memory 6*a* described above. Similarly, when the play switches of the cassette selection memories 6*c* ..... are pressed, the corresponding lamps 5*c* ..... are held on.

Therefore, when the lamp 5*b* of the cassette memory 6*b*, for example, is held on, the light from the lamp is detected by the photoconductive element 7 in the cassette selection detecting box 3 as detecting box 3 rotates upon completion of the playing of the cassette 1*a*, and the cassette 1*b* is automatically played in both the normal and reverse feeds of the tape, by the same operation as described above, as in the case of the cassette 1*a*. Thereafter, the cassettes 1*c*, 1*d* ..... can similarly be played automatically by exactly the same operation as described above.

If the play switch is inadvertently pressed in the process of the selective playing described above, the self-holding state of each of the cassette selection memories 6*a*, 6*b*, 6*c* ..... can be released by pressing the cancel switch 221. Therefore, it is not necessary to memories the selective playing once again.

Although the operation of the apparatus has been described hereinabove with reference to the case when the cassettes 1*a*, 1*b*, 1*c* .... mounted in the cassette mount 2, are selectively played, it is to be understood that all of the cassettes 1*a*, 1*b*, 1*c* ..... mounted in the cassette mount 2 can be automatically played in sequence one after another.

This is possible by turning on the lamps 5*a*, 5*b*, 5*c* ..... by the operation of an automatic switch 225, independently of the switches 222*a* ..... of the relays 222 ...... . In this case, the operation of the play switch 217 has nothing to do with the playing of the cassettes 1*a*, 1*b*, 1*c* ..... .

FIG. 27 shows briefly the mechanism of another embodiment of the present invention. In this embodiment, the motor for operating the cassette mount and the cassette carrier in the preceding embodiment is simultaneously used as a motor for shifting the cassette playing section. This will be described hereinafter:

Referring to FIG. 27, the same mechanisms as those of the preceding embodiment of the apparatus are indicated by same reference numerals, and the drive of the motor 10 is transmitted through a belt 229 to a pulley 232 mounted on a lever 231 which is pivotally mounted on a pin 230 at one end thereof. The other end of the lever 231 is pivotally connected to one end of a lever 234 by a pin 233. The other end of the lever 234 extends across a shifting lever 139 and is supported by a spring 235. Thus, in the normal condition, the pulley 232 is held away from a pulley 133 under the biasing force of the spring 235, which pulley 133 is provided for shifting the cassette playing section 9.

The lever 234 is provided thereon with a pin 236 for engagement with the shifting lever 139. When the other end of the lever 231 is pulled by a plunger 237 through a spring 238, the lever 234 is pulled by said lever 231 and the shifting lever 139 is caused to make a pivotal movement by the pin 236 on said lever 234. A pin 239 is provided to limit the pivotal movement of the lever 231.

In the inoperative state of the apparatus, an idler 12 is held in pressure contact with a pulley 148 and the pulley 232 is held away from the pulley 133.

When the apparatus is connected to a power source, in the condition described above, the motor 10 is set in motion and at the same time, a plunger 149 is energized, as in the preceding embodiment, and the shifting lever 139 is caused to make a pivotal movement in the direction of the arrow *i*. Thus, the cassette mount 2 and the cassette selection detecting box 3 are rotated by the rotating idler 12.

When a cassette to be played has been selected, the plunger 149 is de-energized, so that the idler 12 is brought into pressure contact with the pulley 148 and thus the detected cassette is shifted to the cassette playing section 9. Upon completion of this operation, the plunger 237 is energized, whereupon the lever 231 is caused to make a pivotal movement in the direction of the arrow *k* and the pulley 232 is brought into pressure contact with the pulley 133, with the result that the cassette playing section 9 is moved by the drive of the motor 10. The operation of the plunger 237 also causes a movement of the lever 234 in the direction of the arrow 7. Therefore, the shifting lever 139 is caused to make a slight pivotal movement by the pin 236 in the direction of the arrow *i* and the idler 12 is disengaged from the pulley 148 and placed in an intermediate position of its stroke. Thus, the drive of the motor 10 is used only for shifting the cassette playing section 9. Thereafter, exactly the same function as obtainable from the preceding embodiment can be obtained by controlling the rotation of the motor 10 and the operation of the plungers 237 and 149.

FIG. 28 shows a mechanism for controlling the movement of the cassette playing section 9, in another embodiment of the present invention. In this embodiment, the arrangement is made such that the head plate 112 is moved with a further delay after the cassette playing section 9 has been shifted along with the sliding plate 40 and the first or second playing mechanism 15*a* or 15*b* has been brought into engagement with cassette or, in other words, after the sliding plate 40 has completed its sliding movement, so that the head 117, the pinch roller 115 and the head 118, the pinch roller 116 may be smoothly inserted into the cassette.

In FIG. 28, the same parts as in the preceding embodiment are indicated by same reference numerals. According to this embodiment, a sliding lever 241 having a slot 240 formed in the central portion thereof is provided below a cam 125 which is integral with a shaft 124. This sliding lever 241 is slidably mounted on the shaft 124, with the latter extending through the slot 240, and held in engagement with said shaft 124 by a stopper 242. Further, the sliding lever 241 is constantly biased in the direction of the arrow *m* by a spring 244 which has one end anchored to a bent lug 243 formed at one end of said sliding lever 241, with the other end anchored to the shaft 124, and hence the shaft 124 is in engagement with one end of the slot 240.

A pin 245 to cause a sliding movement of the sliding plate 40 is provided at the other end of the sliding lever 241, and extends upwardly through a slot 246 formed in the cam 125, with the top end thereof in engagement with the sliding plate 40. On the other hand, on both sides of the cam 125 are provided leaf switches 195, 196 corresponding to the leaf switches 195, 196 in the preceding embodiment. These leaf switches are controlled by a projection 247 formed on the bent lug 243 of the sliding lever 241.

In operation, when the cam 125 is rotated by the shaft 124, the sliding lever 241 is also rotated integrally with said cam 125, causing a sliding movement of the sliding plate 40. The arrangement is made such that, when the cam 125 and the sliding lever 241 have been rotated to a position indicated by the broken line in FIG. 28*c*, the sliding plate 40 stops its sliding movement and the first playing mechanism 15*a* is brought into engagement with a cassette. As the cam 125 is further rotated from the position shown, the pin 245 is no longer movable to the left and moves upwardly, as viewed in FIG. 28*c*, along the longitudinal axis P of the slot 132 formed in the sliding plate 40. In other words, the rotation of the cam 125 and the sliding lever 241 is possible only when said sliding lever 241 slides against the biasing force of the spring 244 and the pin 245 moves along the axis P. Since the leaf switch 195 is still open in this case, the head plate 112 is moved even after the sliding plate 40 stops its sliding movement. Therefore, the head 117 and pinch roller 115 are inserted into the front opening of the cassette in a direction perpendicular to the plane of said opening, after the engagement of the reel shafts 47, 48 with the cassette.

Thereafter, the leaf switch 195 is closed by the projection 247 as shown in FIG. 28*c* and the apparatus operates in the same manner as in the preceding embodiment.

With the arrangement described above, there is no fear of the head 117 and the pinch roller 115 being inserted into the cassette in a misaligned state or abutting against the edges of the cassette.

On the other hand, when the cam 125 and the sliding lever 241 are further rotated upon completion of the playing, the pin 245 moves on the axis P in an opposite direction and the sliding lever 241 is returned to its original position. Therefore, the head plate 112 is moved before the sliding plate 40 is caused to make a sliding movement, so that the reel shaft 47, 48 are disengaged from the cassette after the head 117 and pinch roller 115 have been removed from said cassette. Therefore, the operation is also smooth in this case.

It will be obvious that the engagement and disengagement of the cassette and the second playing mechanism 15*b* are also effected by the same relative movement of the head 118, the pinch roller 116 and the playing section 9 as described above.

In the embodiments described and illustrated herein, the lamps 5*a*, 5*b*, 5*c* . . . . . provided in the cassette selecting and memorizing unit 6 are fixed and the photoconductive element 7 of the cassette detecting unit 8 for receiving the light of the lamps 5*a*, 5*b*, 5*c* . . . . . is provided in the cassette selection detecting box 3 for rotation therewith. However, it is to be understood that the same cassette detecting effect of the combination of the lamps and the photoconductive element can be obtained by providing the photoconductive element 7 fixed and the lamps 5*a*, 5*b*, 5*c* . . . . . movably or by providing the photoconductive elements in the same number as the number of cassettes 1*a*, 1*b*, 1*c* . . . . . which can be mounted on the cassette mount 2 and providing only one lamp.

It is also to be understood that, while the present invention has been described herein with reference to an embodiment wherein 6 cassettes are mounted at a time for playing, the apparatus may be arranged so that a greater number of cassettes can be mounted at a time.

It is also to be understood that the apparatus may be constructed such that the playing mechanisms are held stationary and a cassette to be played is moved for engagement with said playing mechanisms, without deviating from the spirit of the invention.

What is claimed is:

1. An automatic player for magnetic tape cassettes each of which contains a supply reel and a take-up reel and a tape wound between the reels therein, comprising a rotatable cassette mounting means adapted to hold a plurality of cassettes radially each in such a position that a head insertion hole and a pinch roller insertion hole are located outwardly with respect to the center of said cassette mounting means, a cassette playback means provided adjacent said cassette mounting means, a cassette selection detecting means associated with said cassette mounting means for selectively detecting a specific one of said cassettes during the rotation of said cassette mounting means, said detecting means coacting with a stop means for the cassette mounting means for stopping the rotation thereof in accordance with the actuation of said detecting means, a cassette carrying means for carrying the specific one of said cassettes from said cassette mounting means horizontally with respect to said cassette playback means, and cassette return means associated with said cassette carrying means for returning the selected cassette being mounted on the playback means to the original position in said cassette mounting means upon completion of the playing.

2. An automatic player according to claim 1, wherein said cassette selection detection means comprises:

a plurality of relay operated memory means at least equal in number to the number of cassette mounting positions on said cassette mounting means;

a plurality of switching means coupled to said relay operated memory means for selectively and individually energizing said memory means; and means for detecting said selectively energized memory means for actuating said stop means to stop the rotation of said cassette mounting means at a point such that said cassette carrying means engages a cassette mounted at a position correspondng to the detected energized memory means.

3. An automatic player according to claim 2, wherein said cassette selection detection means further comprises:

further switching means for simultaneously energizing all of said memory means corresponding to an automatic play mode of operation of said player; and still further switching means for deenergizing all of said memory means.

4. An automatic player according to claim 1, wherein said stop means comprises:

a cam member mounted for rotation with said cassette mounting means and having a plurality of locking grooves formed therein at least equal in number to the number of mounting positions on said cassette mounting means;

a locking member mounted for pivotal movement relative to said cam member, said locking member having a locking leg which engages a cooperating locking groove in said cam member to lock said cam member against rotational movement;

means normally biasing said locking member into locking engagement with said cam member;

solenoid operated means for pivoting said locking member out of locking engagement with said cam member to permit rotation of said mounting means; and means for deenergizing said solenoid operated pivoting means upon actuation of said detection means to cause said biasing means to return said locking member into locking engagement with said cam member.

5. An automatic player according to claim 2, wherein said memory means comprises a plurality of light sources mounted on said cassette mounting means in correspondence with respective cassette mounting positions; and said detection means comprises a photodetector fixed relative to said rotatable mounting means and mounted for optical coupling with the light source which corresponds to the cassette mounting position located in cooperating relationship with said cassette carrying means, said photodetector being coupled to said stop means for stopping rotation of said mounting means when an energized light source is detected by said photodetector.

6. An automatic player according to claim 5, wherein said solenoid operated pivoting means comprises a shifting member coupled to a solenoid and mounted for pivotal movement and having a lug mounted thereon, said lug engaging said locking member to urge said locking member out of locking engagement with said cam member when said shifting member is pivoted in a first direction when said solenoid is energized, said lug being disengaged from said locking member when said solenoid is deenergized, thereby pivoting said shifting member in a second direction and permitting said locking member to return to locking engagement with said cam member.

7. An automatic player for tape cassettes comprising a rotatable mount adapted to hold a plurality of cassettes radially each in such a position that a head insertion hole and a pinch roller insertion hole are located outwardly with respect to the axis of rotation of said cassette mount; a cassette playing section provided adjacent said cassette mount and radially of the rotary axis of the mount, including a sliding plate coplanar with said mount having thereon a pair of similar opposed tape playing mechanisms which are slidably mounted on a support for movement perpendicular to the rotary axis of the mount; a cassette carrier for carrying a selected cassette from an indexed position of the cassette mount; means for slidably moving the selected cassette radially outward in the same plane as that of said mount so as to quickly be brought into said cassette playing section; a cassette selection detecting means operatively connected with said cassette mount for selectively detecting a specific one of the cassettes during the rotation of said cassette mount, said detecting means coacting with a stop means for the cassette mount for stopping the rotation thereof in association with the actuation of said detecting means; and cassette return means associated with said cassette carrier for returning the selected cassette being mounted on the playing section to the original position in said cassette mount upon the completion of the playing.

* * * * *